(12) United States Patent
Zhang et al.

(10) Patent No.: US 11,182,936 B2
(45) Date of Patent: Nov. 23, 2021

(54) DRAWING CONTENT PROCESSING METHOD AND DEVICE FOR TERMINAL APPARATUS, AND TERMINAL APPARATUS

(71) Applicant: Samsung Electronics Co., Ltd., Gyeonggi-do (KR)

(72) Inventors: Weihua Zhang, Beijing (CN); Shilei Liu, Beijing (CN)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/540,637

(22) Filed: Aug. 14, 2019

(65) Prior Publication Data

US 2020/0134890 A1 Apr. 30, 2020

Related U.S. Application Data

(63) Continuation of application No. PCT/CN2018/111720, filed on Oct. 24, 2018.

(51) Int. Cl.
| | | |
|---|---|---|
| *G06F 3/033* | (2013.01) | |
| *G06T 11/20* | (2006.01) | |
| *G06F 3/0354* | (2013.01) | |
| *G06F 3/0484* | (2013.01) | |

(52) U.S. Cl.
CPC ........ *G06T 11/203* (2013.01); *G06F 3/03545* (2013.01); *G06F 3/04842* (2013.01); *G06F 3/04845* (2013.01); *G06F 2203/04806* (2013.01); *G06T 2200/24* (2013.01)

(58) Field of Classification Search
None
See application file for complete search history.

(56) References Cited

U.S. PATENT DOCUMENTS

2009/0300554 A1* 12/2009 Kallinen ............. G06F 3/04883
715/863
2011/0273369 A1* 11/2011 Imai ........................ G06T 15/20
345/158

FOREIGN PATENT DOCUMENTS

CN 107291346 10/2017

OTHER PUBLICATIONS

PCT/ISA/210 Search Report issued on PCT/CN2018/111720 pp. 3.
PCT/ISA/237 Written Opinion issued on PCT/CN2018/111720 pp. 6.

* cited by examiner

*Primary Examiner* — Carl Adams
(74) *Attorney, Agent, or Firm* — The Farrell Law Firm, P.C.

(57) ABSTRACT

The present disclosure provides drawing content processing method and device for a terminal apparatus. The method includes positioning a drawing focus of a user based on a drawing operation of the user and processing drawing content displayed on a screen of the terminal apparatus based on the positioned drawing focus.

18 Claims, 20 Drawing Sheets

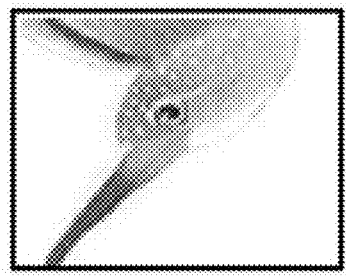
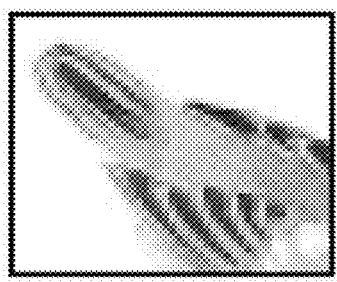
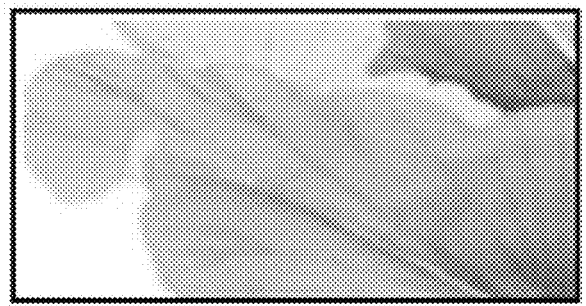
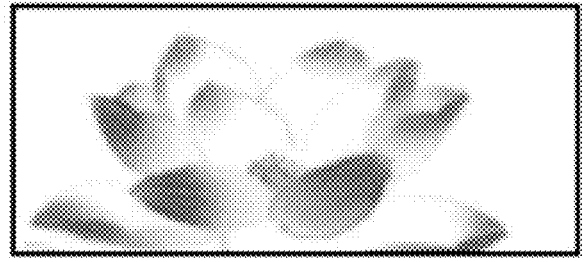
FIG.8A
FIG.8B
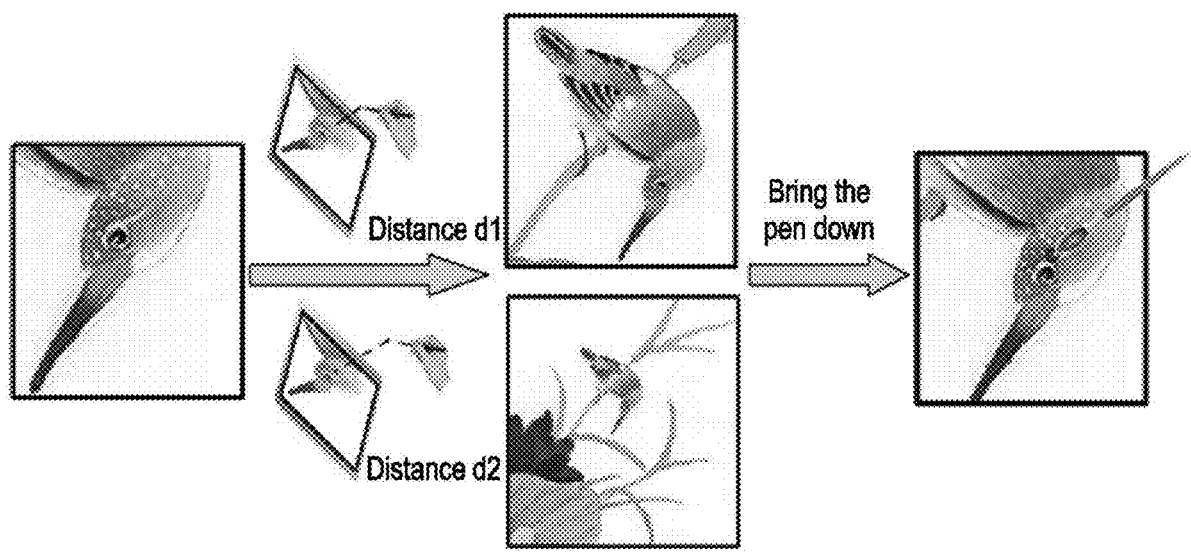
FIG.9

DRAWING CONTENT PROCESSING METHOD AND DEVICE FOR TERMINAL APPARATUS, AND TERMINAL APPARATUS

PRIORITY

This application is continuation of International Application No. PCT/CN2018/111720 filed on Oct. 24, 2018, the entire content of which is incorporated herein by reference.

BACKGROUND

1. Field

The present disclosure relates to terminals, and in particular to a drawing content processing method and device for a terminal apparatus, and a terminal apparatus.

2. Description of the Related Art

Due to the limited screen size of the terminal, when a user uses a terminal apparatus to draw content, it is required to find a drawing focus by continuously performing manual zooming and dragging operations (as shown in FIGS. 1A and 1B). Thus, the operations of the user are very tedious, the efficiency of drawing content is low, the flexibility is low, and the user is less likely to find the previous drawing position after multiple times of manual zooming and dragging operations. After the user draws local details, the user often wants to check the drawing effect and then continues to draw. However, in conventional systems, all the operations are performed manually and frequently, and the drawing inspiration is easily interrupted.

Meanwhile, when the user needs to supplement details to each drawing object one by one after sketching the contour, the user needs to perform a series of manual operations such as zooming-out, dragging or zooming-in a canvas if the user wants to switch between drawing objects. Moreover, if two drawing objects are far apart from each other, this operation process is more inconvenient.

SUMMARY

The present disclosure has been made to address at least the problems and disadvantages described above, and to provide at least the advantages described below. Accordingly, an aspect of the present disclosure provides a method to solve the problems of tedious operations, low drawing efficiency and low flexibility resulted from manually finding a drawing focus when a user uses a terminal apparatus to draw content in conventional systems, one embodiment of the present disclosure provides a drawing content processing method for a terminal apparatus, comprising the following steps of:

positioning a drawing focus of a user based on a drawing operation of the user; and correspondingly processing a drawing content displayed by a terminal apparatus according to the positioned drawing focus.

Wherein, the drawing operation of the user comprises at least one of the following:

a user's operation of selecting a drawing focus, a user's operation of lowering a pen, and an operation of hovering a drawing pen.

Preferably, the user's operation of lowering a pen and/or the operation of hovering a drawing pen are determined based on a distance from the drawing pen to the terminal apparatus.

Further, the drawing operation of the user comprises: a user's operation of lowering a pen and/or an operation of hovering a drawing pen; and the positioning a drawing focus of a user based on a drawing operation of the user comprises at least one of the following:

determining a mapping position of the drawing pen on a terminal screen as the drawing focus of the user;

determining the drawing focus of the user according to information about a drawing content within a local region of the mapping position; and determining the current drawing focus of the user according to a historical drawing focus.

Optionally, the information about a drawing content within a local region of the mapping position comprises at least one of the following:

the thickness of lines of the drawing content, the density of lines of the drawing content, the shape of lines of the drawing content, the color of lines of the drawing content, texture information of the drawing content, and border information of the drawing content.

Optionally, the determining current drawing focus of the user according to a historical drawing focus comprises at least one of the following:

determining a historical drawing focus as the current drawing focus of the user; and determining the historical drawing focus as the current drawing focus of the user if a distance from the mapping position to the historical drawing focus is within a preset distance threshold range, or otherwise, determining the mapping position as the current drawing focus of the user.

Specifically, the correspondingly processing a drawing content displayed by a terminal apparatus comprises at least one of the following:

zooming-in, zooming-out, moving a display position of the drawing focus, switching between drawing objects, displaying drawing reference information, adjusting the resolution of the drawing content, and expanding a canvas bearing the drawing content.

Specifically, the zooming-in is triggered according to at least one of an operation of modifying parameters of the drawing pen, information about the drawing content corresponding to the drawing focus and a user instruction.

Further, triggering zooming-in of the drawing content according to the operation of modifying parameters of the drawing pen and/or the information about the drawing content corresponding to the drawing focus comprises:

estimating a drawing intention of the user according to the operation of modifying parameters of the drawing pen and/or the information about the drawing content corresponding to the drawing focus; and triggering the zooming-in of the drawing content if it is estimated that the drawing intention of the user is fine drawing.

Preferably, a zooming-in factor for executing the zooming-in is determined according to at least one of the following:

the operation of modifying parameters of the drawing pen, the information about the drawing content corresponding to the drawing focus, a distance from the drawing pen to the terminal apparatus, the speed of bringing a pen down, and the size of the terminal screen.

Preferably, the parameters of the drawing pen comprise at least one of pen type, line type, line color and texture information.

Optionally, the information about the drawing content corresponding to the drawing focus comprises at least one of the following:

the thickness of lines of the drawing content, the density of lines of the drawing content, the shape of lines of the drawing content, the proportion of the drawing content in a canvas, the proportion of the drawing content in a canvas region displayed on the terminal screen, historical processing information of the drawing content, and historical processing information of a drawn content associated with the drawing content.

Optionally, the zooming-out is triggered according to at least one of a user's operation of raising the pen, a user instruction, and historical processing information of the drawing content corresponding to the drawing focus.

Preferably, a zooming-out factor for executing the zooming-out is determined according to at least one of the following:

a distance from the drawing pen to the terminal apparatus, the speed of raising the pen, the historical processing information of the drawing content corresponding to the drawing focus, correlation with the drawing content corresponding to the drawing focus, and the size of the terminal screen.

Optionally, the correlation with the drawing content corresponding to the drawing focus comprises at least one of the following: temporal correlation, spatial correlation, drawing object correlation, and style correlation.

Specifically, the moving a display position of the drawing focus comprises:

moving the drawing focus of the user to a preset position on the terminal screen for displaying; and/or moving the display position of the drawing focus of the user, to correspond the drawing focus to the mapping position of the drawing pen on the terminal screen.

Optionally, the switching between drawing objects is triggered according to at least one of a user's operation of raising the pen, a user instruction, similarity between drawing objects, a display position of a drawing object to be drawn, and historical processing information of the drawing content corresponding to the drawing focus.

Specifically, a switched drawing object is determined according to at least one of the following:

a distance between drawing objects corresponding to the drawing focus of the user;

similarity between the drawing objects corresponding to the drawing focus of the user; and a user instruction.

Further, the method further comprises the following step of: adjusting the zoom scale of the canvas according to the size of the switched drawing object.

Specifically, the user's operation of raising the pen is determined based on the distance from the drawing pen to the terminal apparatus.

Optionally, the adjusting the resolution of the drawing content is triggered according to at least one of a change in zoom scale of the canvas and a user instruction.

Specifically, the adjusted resolution is determined according to the size of the current canvas, the size of the terminal screen and the resolution of the terminal screen.

Preferably, the adjusting the resolution of the drawing content comprises at least one of the following: interpolating, natural border smoothing, line interior smoothing, and contour adjusting.

Optionally, expanding the canvas bearing the drawing content is triggered according to at least one of a motion trend of the drawing pen, a canvas region displayed on the terminal screen and a user instruction.

Further, after expanding the canvas bearing the drawing content, the method further comprises:

fitting the drawing content of the user in the expanded canvas according to a drawing trajectory of the drawing pen in the canvas and a motion trend of the drawing pen.

Specifically, the displaying drawing reference information comprises:

searching the drawing reference information according to the drawing content corresponding to the drawing focus, and displaying the searched drawing reference information.

Specifically, the searching the drawing reference information according to the drawing content corresponding to the drawing focus comprises:

searching the drawing reference information according to content similarity and/or style similarity with the drawing content corresponding to the drawing focus.

Further, the method further comprises the following step of:

adjusting a display mode of the drawing reference information based on a display mode of the drawing content corresponding to the drawing focus.

Specifically, the display mode comprises the zoom scale and/or the display position.

Another embodiment of the present disclosure provides a drawing content processing device for a terminal apparatus, comprising:

a positioning module, configured to position a drawing focus of a user based on a drawing operation of the user; and a processing module, configured to correspondingly process a drawing content displayed by the terminal apparatus according to the positioned drawing focus.

Still another embodiment of the present disclosure further provides a terminal apparatus, configured to execute the drawing content processing method.

In the method, the device or terminal apparatus provided by the present disclosure, by positioning a drawing focus according to a drawing operation of a user and correspondingly processing a drawing content displayed by the terminal apparatus based on the drawing focus, the frequent processing of manually zooming and dragging a canvas to find a drawing focus is simplified, the drawing efficiency of the user is improved, and the flexibility of the user in using a terminal apparatus to draw content is improved.

Additional aspects and advantages of the present disclosure will be partially appreciated and become apparent from the descriptions below, or will be well learned from the practice of the present disclosure.

BRIEF DESCRIPTION OF THE DRAWINGS

The foregoing and/or further aspects and advantageous of the present disclosures will become apparent and be more readily appreciated from the following descriptions of embodiments, with reference to the accompanying drawings, in which:

FIGS. 8A and 8B are diagrams of examples of a drawing content corresponding to a drawing focus according to an embodiment of the present disclosure;

FIG. 9 is a schematic diagram of viewing the overall drawing effect after raising the pen according to an embodiment of the present disclosure;

DETAILED DESCRIPTION

Figures 1A, 1B:
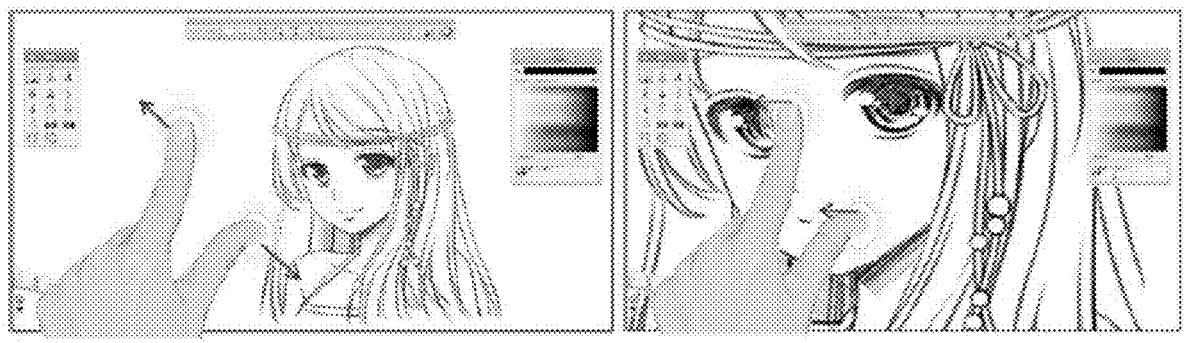
FIG. 1A is a schematic diagram of manually zooming a canvas in the prior art.
FIG. 1B is a schematic diagram of manually dragging a canvas in the prior art.

Embodiments of the present disclosure will be described in detail hereinafter. The examples of these embodiments have been illustrated in the drawings throughout which same or similar reference numerals refer to same or similar elements or elements having same or similar functions. The embodiments described with reference to the drawings are illustrative, merely used for explaining the present disclosure and should not be regarded the limit of the present disclosure.

Figure 2:
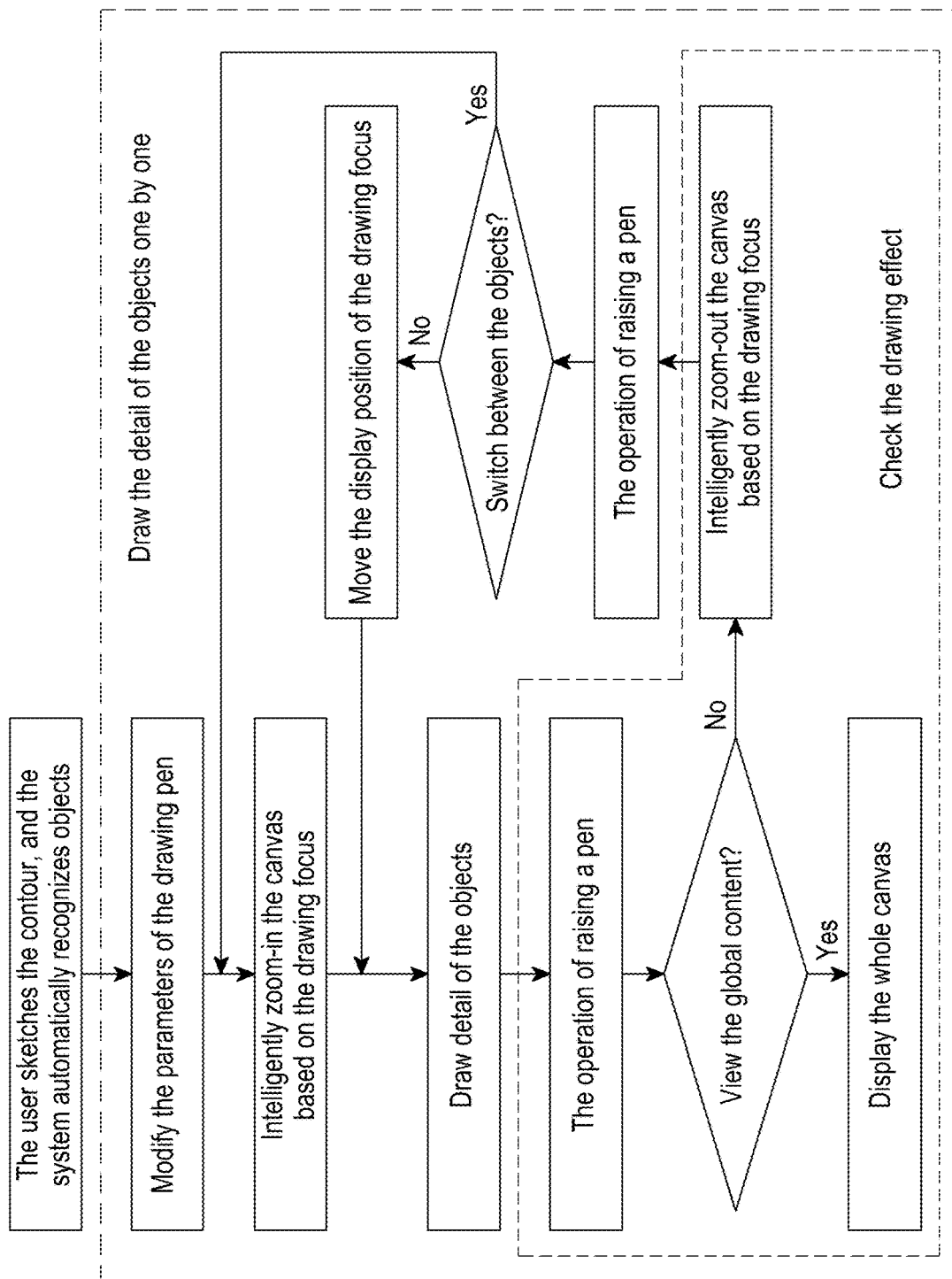
FIG. 2 is a flowchart of drawing by a terminal apparatus according to an embodiment of the present disclosure.

The order of drawing by a user is usually as follows: sketching the overall contour and layout first and then filling detailed information one by one. Based on the drawing habit of the user, the present disclosure provides an intelligent drawing system. As shown in FIG. 2, the basic flow is as follows: the system automatically identifies drawing objects and then classifies similar drawing objects, when the user fills detailed information for the drawing objects one by one, the system intelligently positions a drawing focus of the user according to the user's operation of selecting the drawing focus, a user's operation of bringing a pen down, an operation of hovering a drawing pen or more, then automatically triggers a function of intelligently zooming-in a canvas according to an operation of modifying parameters of the drawing pen, information about the drawing content corresponding to the drawing focus, a user instruction or more, and calculates a zooming-in factor of the canvas and intelligently zooms-in the canvas based on the drawing focus. Thus, the user's frequent operations of manually zooming-in a canvas are avoided.

When the user draws details of an object, the system triggers a function of intelligently zooming-out the canvas according to an operation of raising the pen, a user instruction, historical processing information of the drawing content corresponding to the drawing focus, or more during the detail drawing process of the user. If the system determines that the user wants to view the overall content, the system can directly display the whole canvas; or otherwise, the system calculates a zooming-out factor of the canvas and then intelligently zooms-out the canvas based on the drawing focus. Thus, the user's frequent operation of manually zooming-out a canvas is avoided.

When the user brings the pen down again after raising the drawing pen, the system determines whether it is required to switch between drawing objects. If it is not required to switch between the drawing objects, the system can move a display position of the drawing focus, for example, to correspond the drawing focus to a mapping position of the drawing pen on the terminal screen, so that the user can directly continue to draw detail content at the position before raising the pen, without manually dragging the canvas to find a drawing focus.

If it is required to switch between the drawing objects, the system can determine a switched drawing object according to a distance and similarity between the drawing objects corresponding to the drawing focus of the user and a user instruction, and then automatically switch between the drawing objects. After switching between the drawing objects, the switched drawing object corresponds to the current drawing focus of the user. The system adjusts the zoom scale of the canvas according to the size of the switched drawing object, and the user only needs to continuously draw the detail content for the switched drawing object, without needing to select the next drawing object by manually dragging the canvas.

Figure 3:
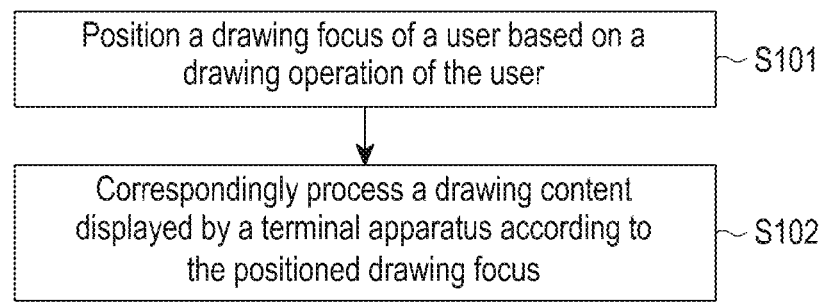
FIG. 3 is a flowchart of a drawing content processing method for a terminal apparatus according to an embodiment of the present disclosure.

Based on the above principle, as shown in FIG. 3, one embodiment of the present disclosure provides a drawing content processing method for a terminal apparatus, specifically comprising the following steps of:

S101: positioning a drawing focus of a user based on a drawing operation of the user; and, S102: correspondingly processing a drawing content displayed by a terminal apparatus according to the positioned drawing focus.

In this embodiment of the present disclosure, the drawing focus is a local region or position to be drawn by the user, wherein the drawing operation of the user in the step S101 comprises at least one of the following: a user's operation of selecting a drawing focus, a user's operation of bringing a pen down, and an operation of hovering a drawing pen.

I. The specific method for determining a drawing focus according to the user's operation of selecting the drawing focus is described below.

Figure 4:
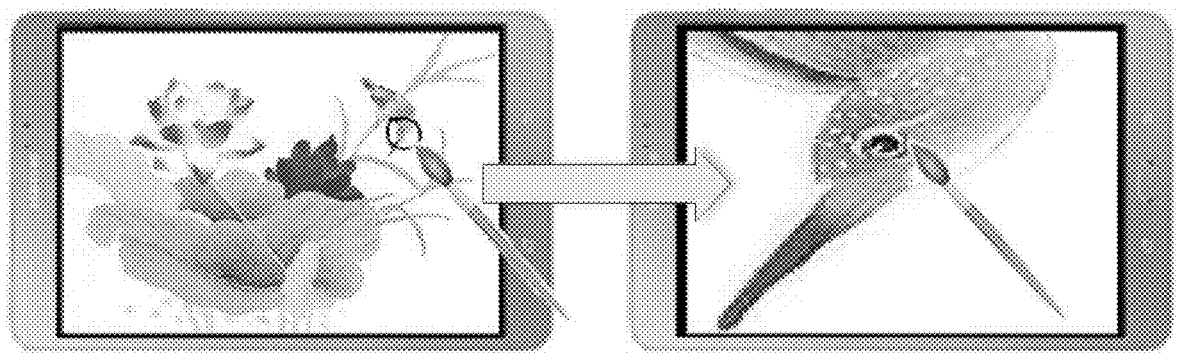
FIG. 4 is a schematic diagram of circling a drawing focus by a user according to an embodiment of the present disclosure.

The user directly selects a local region or position to be drawn on a canvas. As shown in FIG. 4, the user selects the local region to be drawn on a display screen by circling, or the user directly clicks on the display screen to select the position to be drawn. Upon detecting the operation of the user, the terminal apparatus determines the local region or position selected by the user as the local region or position to be drawn by the user, i.e., the drawing focus of the user.

In FIG. 4, after the user selects the drawing focus, the terminal apparatus automatically zooms-in the canvas according to the positioned drawing focus, and the user can finely draw on the zoomed-in canvas with respect to the drawing focus.

II. The user's operation of bringing a pen down and/or the operation of hovering a drawing pen are/is determined based on a distance from the drawing pen to the terminal apparatus. Specifically, the steps of positioning the drawing focus based on the user's operation of bringing a pen down and/or the operation of hovering the drawing pen comprise at least one of the following:

1. A mapping position of the drawing pen on a terminal screen is determined as the drawing focus of the user.

The terminal apparatus can detect a distance from the drawing pen to the terminal apparatus; and, when the distance from the drawing pen to the terminal apparatus reaches a preset trigger distance, the terminal apparatus detects an event of bringing a pen down. At this time, the current mapping position of the drawing pen on the screen is the position of bringing a pen down of the drawing pen, so this position is regarded as the position to be drawn by the user, i.e., the drawing focus.

Similarly, the terminal apparatus can detect the distance from the drawing pen to the terminal apparatus; and, when the distance from the drawing pen to the terminal apparatus reaches the preset trigger distance and the drawing pen stays for a period of time, the terminal apparatus detects an event of hovering the drawing pen. At this time, the current mapping position of the drawing pen on the screen is the hovering position of the drawing pen, so this position is regarded as the position to be drawn by the user, i.e., the drawing focus.

2. The drawing focus of the user is determined according to information about information about a drawing content within a local region of the mapping position.

The information about the drawing content within the local region of the mapping position comprises at least one of the following: the thickness of lines of the drawing content, the density of lines of the drawing content, the shape of lines of the drawing content, the color of lines of the drawing content, texture information of the drawing content, and border information of the drawing content.

Upon detecting the position of bringing a pen down or the hovering position of the drawing pen, the terminal apparatus determines a local region of the position of bringing a pen down or the hovering position in the canvas according to the thickness of lines, the density of lines, the color of lines, the shape of lines, texture information or more of the drawing content at the positioning of bringing a pen down or the hovering position, and then uses this local region as the local region to be drawn by the user, i.e., the drawing focus of the user.

Figure 5:
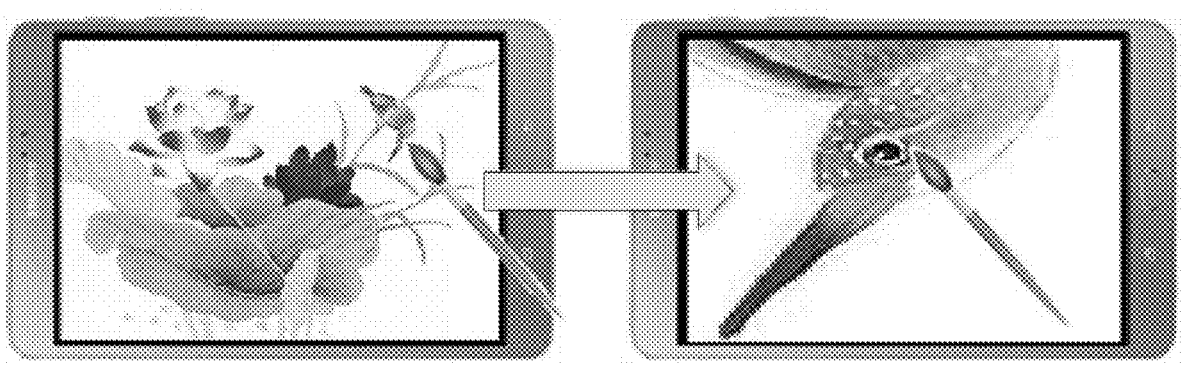
FIG. 5 is a schematic diagram of determining a drawing focus according to a position of bringing a pen down, according to an embodiment of the present disclosure.

As shown in FIG. 5, the terminal apparatus detects that the position of bringing a pen down of the user is animal's eyes. Since the lines of the animal's eyes are thinner, denser and black and greatly differ from other regions, the region of the animal's eyes may be determined as a drawing region of the user. In FIG. 5, the terminal apparatus automatically zooms-in the canvas according to the positioned drawing focus, and the user can finely draw on the zoomed-in canvas with respect to the drawing focus.

In addition, the terminal apparatus can also position the drawing focus according to the border information (for example, border contour) of the drawing content at the position of bringing a pen down or the hovering position. For example, according to the border information of the drawing content at the position of bringing a pen down or the hovering position, the terminal apparatus can determine a closed local region of the position of bringing a pen down or the hovering position, and then use the determined closed local region as the local region to be drawn by the user, i.e., the drawing focus of the user.

Figure 6:
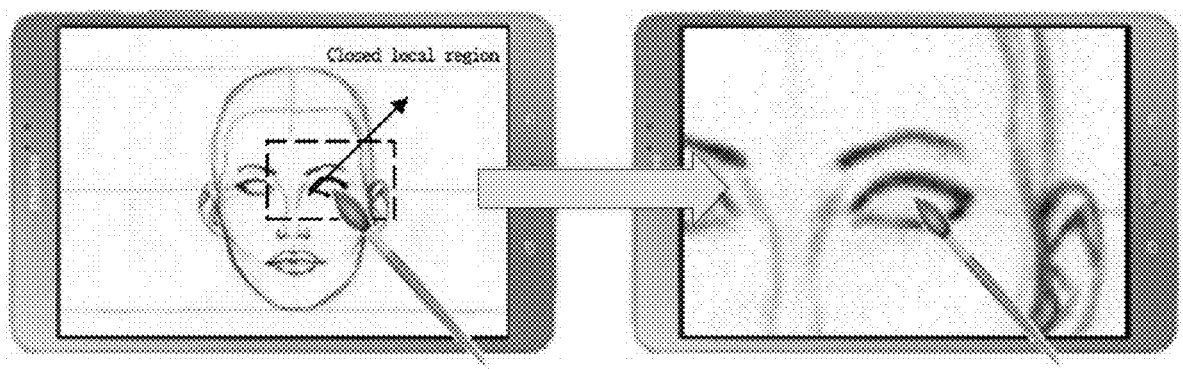
FIG. 6 is a schematic diagram of determining a drawing focus according to a closed local region of the position of bringing a pen down, according to an embodiment of the present disclosure.

As shown in FIG. 6, the terminal apparatus detects the position of bringing a pen down of the drawing pen and can extract a border contour of the region of the position of bringing a pen down so as to determine the closed local region of the position of bringing a pen down. In FIG. 6, the terminal apparatus automatically zooms-in the canvas according to the positioned drawing focus, and the user can finely draw on the zoomed-in canvas with respect to the drawing focus.

3. The current drawing focus of the user is determined according to a distance from the mapping position to a historical drawing focus.

Wherein, the historical drawing focus comprises at least one of the following:

a drawing focus when the user draws a content in the last time; a drawing focus before raising the pen when the user raises the pen and then brings a pen down again; and, a drawing focus when the user previously draws the content within the region of the mapping position.

The terminal apparatus can directly determine a historical drawing focus as the current drawing focus of the user; or can detect a distance from the mapping position to the historical drawing focus, and then determine the historical drawing focus as the current drawing focus of the user if the distance is within a preset distance threshold range, or otherwise, determine the mapping position as the current drawing focus of the user.

1) The drawing focus when the user draws a content in the last time:

The terminal apparatus may be interrupted sometimes. For example, it quits abnormally because of an incoming call, a message, or automatic power-off due to insufficient electricity; or a drawing application may be interrupted. This embodiment of the present disclosure proposes that the terminal apparatus will record the drawing focus of the user before the terminal apparatus is interrupted. When the user uses the terminal apparatus to enter the drawing application again, the terminal apparatus can directly use the drawing focus before the interruption (i.e., the drawing focus when the user draws a content in the last time) as the current drawing focus of the user. Or, the terminal detects the current position of bringing a pen down or the current hovering position of the user. If the position of bringing a pen down or the hovering position is very close to the drawing focus when drawing a content in the last time, it is considered that the user wants to continue to draw the content, and the drawing focus when drawing the content in the last time can be directly used as the current drawing focus of the user. If the position of bringing a pen down or the hovering position is very far away from the drawing focus when drawing the content in the last time, it is considered that the user wants to draw other content, and the mapping position can be directly used as the current drawing focus of the user.

2) The drawing focus before raising the pen when the user raises the pen and then bring the pen down again:

Due to the limited screen of the terminal apparatus, when the user uses the terminal apparatus to draw, the user often needs to view the overall effect of a drawn part after drawing for several strokes, and then continues to draw or modifies the drawn part. This embodiment of the present disclosure proposes that, upon detecting an operating of raising the pen, the terminal apparatus will record a drawing focus of the user before raising the pen; and, upon detecting an operating of bringing a pen down or an operation of hovering the drawing pen, the terminal apparatus can directly use the drawing focus before raising the pen as the current drawing focus of the user. Or, the terminal detects the current position of bringing a pen down or the current hovering position of the user. If the position of bringing a pen down or the hovering position is very close to the drawing focus before raising the pen, it is considered that the user wants to continue to draw the content, and the drawing focus before raising the pen can be directly used as the current drawing focus of the user. If the position of bringing a pen down or the hovering position is very far away from the drawing focus before raising the pen, it is considered that the user wants to draw other content, and the mapping position can be directly used as the current drawing focus of the user.

3) The drawing focus of the user previously drawing the content within the region of the mapping position:

When the user uses the terminal apparatus to draw, the user will often draw content A first and then draw content B, and may modify content A while drawing content B. This embodiment of the present disclosure proposes that, when the user draws content, the terminal apparatus records a correspondence between a region of a drawing focus and the drawing focus. Upon detecting an operation of bringing a pen down or an operation of hovering the drawing pen, the terminal apparatus detects a local region of the mapping position, and then determines a drawing focus corresponding to the local region according to the recorded content, so that the terminal apparatus can directly uses the drawing focus corresponding to the local region as the current drawing focus of the user. Or, if the mapping position is very close to the drawing focus corresponding to the local region, the drawing focus corresponding to the local region can be directly used as the current drawing focus of the user; and, if the position of bringing a pen down is far away from the drawing focus corresponding to the local region, the mapping position can be directly used as the current drawing focus of the user.

Due to the limited screen of the terminal apparatus, when the user uses the terminal apparatus to draw, the user often needs to view the overall effect of a drawn part after drawing for several strokes, and then continues to draw or modifies the drawn part. At this time, the usual processing is zooming-in the canvas and finding the drawing position before viewing. In this way, the drawing process will often be interrupted by these frequent processing. Therefore, in this embodiment of the present disclosure, after triggering the function of intelligently zooming-out the canvas, the terminal apparatus can determine a drawing intention of the user according to the hovering position of the drawing pen.

Wherein, the distance from the drawing pen to the terminal apparatus can be obtained by automatically selecting the best communication mode according to the electricity quantity or network condition of the terminal apparatus, or can be obtained by a wearable device. For example, the distance from the drawing pen to the terminal apparatus can be obtained by a mobile network, Wi-Fi, Bluetooth, ultrasound, IR, a sensor or in other ways. If the electricity quantity of the drawing pen is sufficient, the fast transmission mode can be selected, or otherwise, a mode having less power consumption is selected; or, the mobile network or Wi-Fi transmission is selected according to the network condition of the space where the terminal apparatus is located. Or, the distance can also be directly obtained by a front camera or a wearable device.

It is to be noted that drawing can be performed on the screen by a drawing pen or a finger when the user uses the terminal apparatus to draw.

The correspondingly processing a drawing content displayed by a terminal apparatus in step S102 comprises at least one of the following: zooming-in, zooming-out, moving a display position of the drawing focus, switching between drawing objects, displaying drawing reference information, adjusting the resolution of the drawing content, and expanding a canvas bearing the drawing content. Each corresponding processing will be described below in details.

I. Zooming-in

The order of drawing by a user is usually as follows: sketching the overall contour and layout first and then finely filling detailed information. This embodiment of the present disclosure proposes that, during supplementing details after the user sketches the overall contour and layout, the drawing focus is automatically positioned and the canvas is intelligently zoomed according to the drawing focus. In addition, the solutions of the present disclosure can be applicable to the process of sketching the overall contour and layout by the user. When the user uses the terminal apparatus to draw, the terminal apparatus can employ the technical solutions of the present disclosure to intelligently zoom the canvas based on the drawing focus, so that the drawing experience of the user is improved.

During drawing of the user, if the canvas is very large and when the user supplements details, it is generally required to zoom-in a region to be drawn and then draw details. In conventional systems, the user needs to manually move the canvas to move the region to be drawn to a central region of the screen, and then zooms-in the region to be drawn by a gesture. The processing of the user is very tedious. Therefore, this embodiment of the present disclosure proposes that, when the user supplements details, the terminal apparatus can automatically zoom-in and move the current canvas, and zoom-in and display a local region to be drawn currently, i.e., the drawing focus of the user.

For example, after the user sketches the overall layout, the terminal apparatus recognizes drawing objects according to information such as content, lines and color of the drawn part and in combination with an image recognition technology. When the user starts to finely draw a certain drawing object in the canvas, the user usually changes parameters of the drawing pen, such as pen type and line type. These operations can be used for triggering the function of intelligently zooming-in the canvas, or used for calculating the zoom scale for zooming-in the canvas. Thus, the terminal apparatus intelligently zooms-in the canvas based on the drawing focus.

Specific embodiment: when a user is drawing a painting of Pond moonlight, the user first designs the overall layout and sketches the main contour. At this time, the system will recognize the image and then classify drawing objects according to the similarity between the drawing objects, for example, lotuses, lotus leaves, fish or more. At this time, the user changes the pen type so that the pen nib become thinner, and changes the line color to pink. The terminal apparatus estimates that the user may want to draw the petals of the lotuses. Meanwhile, the user hovers the drawing pen over the petals of one lotus. The terminal apparatus will automatically zoom-in this lotus to an appropriate scale, and zoom-in the petals of this lotus as the drawing focus for displaying. If the user changes a thinner pen, changes the color to yellow and hovers the pen over the center position of the lotus, the terminal apparatus automatically increases the zoom scale for the user to draw the stamen of the lotus.

This embodiment of the present disclosure proposes that, when the terminal apparatus has positioned the drawing focus of the user and detected that the trigger conditions of intelligently zooming-in the current canvas are met, the function of intelligently zooming-in the current canvas is triggered. The terminal apparatus intelligently zooms-in the canvas based on the drawing focus, and the drawing focus of the user is zoomed-in and displayed on the display screen.

The process of positioning the drawing focus of the user is the same as that in the foregoing description and will not be repeated here.

Specifically, the process of intelligently zooming-in the current canvas can be triggered by at least one of the following ways.

1. An operation of modifying parameters of the drawing pen

Upon detecting a user's event of modifying the parameters of the drawing pen, the terminal apparatus estimates a drawing intention of the user according to the user's event of modifying parameters of the drawing pen, so as to determine whether the trigger conditions of intelligently zooming-in the current canvas are met. If it is estimated that the drawing intention of the user is fine drawing, it is considered that the trigger conditions of intelligently zooming-in the current canvas are met, and the terminal apparatus automatically triggers zooming-in of the current canvas, i.e., zooming-in the drawing content.

Preferably, the parameters of the drawing pen comprise at least one of pen type, line type, line color and texture information.

a. Modifying the pen type

Different pen types are used for different purposes during drawing. The terminal apparatus can determine a drawing intention of the user according the purposes of various pen types. For example, after the user sketches the contour with a pencil and then changes to other pens, for example, a crayon, a water color pen or more, the terminal apparatus determines the drawing intention of the user according to the event of changing the pen type. When the drawing intention may be filling a local region, the terminal apparatus determines that the trigger conditions of intelligently zooming-in the current canvas are met.

Figure 7:
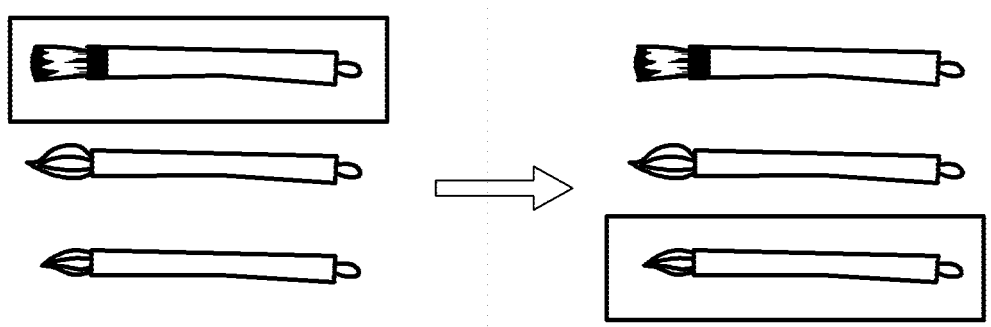
FIG. 7 is a schematic diagram of modifying pen type according to an embodiment of the present disclosure.

After the pen type is modified, the thickness of the drawing pen may be changed correspondingly. The terminal apparatus can determine the drawing intention of the user according to the thickness of the drawing pen. When the user wants to draw details, the user usually changes a pen type suitable for drawing details. As shown in FIG. 7, the user changes a thick pen for regular script in big characters to a thin pen for regular script in small characters. By comparing the thickness of the drawing pens before and after the changing, the terminal apparatus determines that the drawing intention of the user should be drawing some fine parts. In this case, the terminal apparatus determines that the canvas needs to be zoomed-in, and confirms that the trigger conditions of intelligently zooming-in the current canvas are met.

After the pen type is modified, the texture/color information of the drawing pen may be changed correspondingly. The terminal apparatus can determine the drawing intention of the user according to the texture/color information of the drawing pen. For example, if the user uses a black common drawing pen to sketch the contour previously and then uses a color drawing pen with particular texture, the terminal apparatus determines, according to the modification event, that the drawing intention of the user should be drawing special effects in a local region. In this case, the terminal apparatus confirms that trigger conditions of intelligently zooming-in the current canvas are met.

b. Modifying the line type

The terminal apparatus can determine the drawing intention of the user according to the thickness of lines. For example, the user usually uses a thinner line type to draw details part, and the system determines, according to an event of changing the line type, that the drawing intention of the user may be finely drawing a local region of the canvas. In this case, the terminal apparatus confirms that the trigger conditions of intelligently zooming-in the current canvas are met.

c. Modifying the line color

The terminal apparatus can determine the drawing intention of the user according to the color of lines. For example, if the user uses a black line to sketch the contour previously and then changes a color line, the system determines, according to the modification event, that the drawing intention of the user should be drawing special effects in a local region. In this case, the terminal apparatus confirms that trigger conditions of intelligently zooming-in the current canvas are met.

2. Information about the drawing content corresponding to the drawing focus

The terminal apparatus determines the content to be drawn by the user according to the drawing focus (i.e., the drawing content corresponding to the drawing focus) of the user, then estimates the drawing intention of the user according to information about the content to be drawn, and determines, according to the drawing intention of the user, whether the trigger conditions of intelligently zooming-in the current canvas are met. If it is estimated that the drawing intention of the user is fine drawing, it is considered that the trigger conditions of intelligently zooming-in the current canvas are met, and the terminal apparatus automatically triggers zooming-in of the current canvas, i.e., zooming-in the drawing content.

a. It is determined whether the content to be drawn is the content to be finely drawn by the user, according to the thickness, shape, density or more of the lines of the content to be drawn.

For example, when the lines of the content to be currently drawn by the user are thinner and denser, the terminal apparatus determines the content to be drawn as the content to be finely drawn by the user, and thus confirms that the trigger conditions of intelligently zooming-in the current canvas are met.

b. It is determined whether the content to be drawn is the content to be finely drawn by the user, according to the proportion of the content to be drawn in the whole canvas or the proportion of the content to be drawn in a canvas region currently displayed on the terminal screen.

When the proportion of the content to be drawn in the whole canvas or in the canvas region currently displayed on the terminal screen is less than a set proportion threshold, it is determined that the trigger conditions of intelligently zooming-in the current canvas are met.

Wherein, different screen sizes of different terminal apparatuses may correspond to different proportion thresholds. For example, the proportion threshold for a mobile phone is greater than that for a tablet computer. In other words, the same content, when drawn on a mobile phone, may be zoomed-in for displaying, while when drawn on a tablet computer, may not be zoomed-in for displaying.

c. It is determined whether the function of intelligently zooming-in the current canvas needs to be triggered according to historical processing information of the content to be drawn.

For example, when the user uses the terminal apparatus to draw, the user often needs to view the overall effect of a drawing part after drawing for several strokes, and then continues to draw or modifies the drawn part. Upon detecting a user's operation of raising the pen, the terminal apparatus records processing information (including a zoomed-in state, etc.) of the drawing content corresponding to the drawing focus before the operation of raising the pen. After the terminal apparatus detects a user's operation of raising pen or an operation of hovering the drawing pen and if the positioned drawing focus is consistent with the drawing focus before raising the pen, the terminal apparatus can determine whether to trigger the function of intelligently zooming-in the current canvas after bringing a pen down, according to the processing information corresponding to the drawing content before raising the pen. Wherein, the drawing content before raising the pen is the content displayed after zooming-in, it can be determined that the trigger conditions of intelligently zooming-in the current canvas are met.

d. It is determined whether the function of intelligently zooming-in the current canvas needs to be triggered according to historical processing information of the drawn content associated with the content to be drawn.

Wherein, the association mode can be similar content or other association modes.

The historical processing information can include, but not limited to, a zoomed-in state of the drawn content.

For example, the user draws a multiple of similar objects one by one, where object A and object B are two of these objects. When there is an object similar to the object A (i.e., the object B) in the drawn content when drawing the object A, and when the terminal apparatus executes the function of intelligently zooming-in the canvas when drawing the object B (where the zooming-in factor is Ka), the terminal apparatus determines that the function of intelligently zooming-in the canvas also needs to be executed when drawing the object A.

In another case, when drawing the content A, if there is no content similar to the content A in the drawn content, the system can determine whether the trigger conditions of intelligently zooming-in the current canvas are met in other ways. If the zoomed-in state, determined by the system now, does not conform to the habits of the user, the user can assist in adjusting the zoom scale of the canvas by zooming the canvas by a gesture or in other ways. For example, if the system determines that the trigger conditions of intelligently zooming-in the current canvas are not met in other ways, the canvas will not be zoomed-in; or if the system determines that the current situation satisfies the trigger conditions and thus zooms-in the canvas, but the zoom scale is inappropriate (too small or too large), the user can adjust the zoom scale of the canvas by a zooming gesture. In this case, the system will record the zoomed-in state of the canvas when drawing the content A, for example, the zooming-in factor determined by the system, the zooming-in factor of the canvas adjusted by the user, or other information. When drawing the content B, if the system detects that the drawn content A is similar to the content B, the system acquires the zoomed-in state of the canvas recorded when drawing the content A, considers whether to zoom-in the canvas when drawing the content B preferably according to the zoomed-in state of the canvas when drawing the content A, and adjusts the zooming-in factor when zooming-in the canvas.

3. User instruction.

The user can send an instruction of intelligently zooming-in the current canvas by any one or any combination of voice, a key, a gesture, an external controller and other interaction ways, and the terminal apparatus confirms that the trigger conditions of intelligently zooming-in the current canvas are met upon detecting the instruction of intelligently zooming-in the current canvas.

Regarding to the activation by voice, for example, the use presets a voice activation instruction "Zoom-in the canvas". If the voice-controlled instruction "Zoom-in the canvas" sent by the user is received, voice recognition is performed on the voice-controlled instruction so as to confirm the reception of the instruction of intelligently zooming-in the current canvas.

Regarding to the activation by a key, the key can be a hardware key, for example, the volume key or the home key. The user can activate the function of zooming-in the current canvas by long pressing the volume key "+" or the home key. Upon detecting the long-press operation event of the user, the terminal apparatus confirms the reception of the instruction of intelligently zooming-in the current canvas at this time. The key can also be a virtual key in the drawing software, for example, a virtual control button, a menu, etc., on the screen. Upon receiving an event of clicking the virtual key by the user, the terminal apparatus confirms the reception of the instruction of intelligently zooming-in the current canvas.

Regarding to the activation by a gesture, the gesture comprises a screen gesture, for example, double-clicking the screen/long pressing the screen, etc. The gesture further comprises an air gesture, for example, shaking/rolling/tilting the terminal. The gesture can be a single gesture or any combination of any gestures.

Regarding to the activation by an external controller, the external controller can be a drawing pen associated with the terminal. For example, when the terminal detects that the drawing pen is taken out and then inserted into the terminal quickly, or a preset key on the drawing pen is pressed down, or the user makes a preset air gesture by using the drawing pen, it is confirmed that the instruction of intelligently zooming-in the current canvas is received. The external controller can also be a wearable device or other device associated with the terminal, where the wearable device can be a smart watch, a pair of smart glasses, etc. The wearable device or other device can access to the terminal of the user through wifi and/or nfc and/or Bluetooth and/or a data network. The wearable device or other device confirms that the user wants to activate the function of zooming-in the current canvas in at least one interaction way of voice, a key and a gesture, and then informs the terminal apparatus.

Further, during the process of zooming-in the canvas, the terminal apparatus can first position the drawing focus of the user, and then detect that the trigger conditions of intelligently zooming-in the current canvas are met. For example, the user first selects a local region to be drawn on the display screen by circling, and then changes the pen type. The terminal apparatus determines a drawing region of the user through the circling operation of the user, and confirms that the trigger conditions of intelligently zooming-in the current canvas are met according to the detected event of changing the pen type.

The terminal apparatus can also detect that the trigger conditions of intelligently zooming-in the current canvas are met and then position the drawing focus of the user. For example, the user first changes the pen type and then holds the drawing pen to approach to the screen. The terminal apparatus confirms that the trigger conditions of intelligently zooming-in the current canvas are met according to the detected event of changing the pen type, and detects an event of bringing a pen down through a distance from the drawing pen to the terminal apparatus, so as to determine the drawing region of the user.

The terminal apparatus can also execute the two steps simultaneously. For example, the user detects a local region to be drawn on the display screen by circling, and the terminal apparatus determines a drawing region of the user through the circling operation of the user and then confirms that the trigger conditions of intelligently zooming-in the current canvas are met according to the thickness of lines and the density of lines within the drawing region.

During zooming-in the current canvas, it is required to zoom-in according to a corresponding zooming-in factor so that the zoomed-in canvas meets the user's demands. In this embodiment of the present disclosure, the zooming-in factor for executing the zooming-in is determined by at least one of the following.

1. An operation of modifying parameters of the drawing pen

Wherein, the parameters of the drawing pen comprise at least one of pen type, line type, line color and texture information. Upon detecting the event of modifying the parameters of the drawing pen by the user, the terminal apparatus sets the zooming-in factor $Ks$ of the current canvas or sets an adjustment factor $Ka$ of the zooming-in factor of the current canvas according to at least one of the following information before and after modifying the parameters of the drawing pen: the thickness of the drawing pen, the texture of the drawing pen, line color, and texture information.

For the thickness of the drawing pens before and after modifying the pen type/line type, the proportionality coefficient $k1$ of the zooming-in factor of the current canvas can be set according to the thickness proportion of the drawing pens before and after modifying the pen type. If the terminal apparatus detects that the user is drawing the contour part of an object by using a pen type having a width $w1$ of the drawing pen and then using a pen type having a width $w2(w2<w1)$ of the drawing pen, i.e., changing a thinner pen type, the terminal apparatus triggers the function of intelligently zooming-in the current canvas. The terminal apparatus can set the proportionality coefficient ($k1=w1/w2$) according to the thickness proportion of the drawing pens before and after modifying the pen type.

For the texture information of the drawing pens before and after modifying the pen type, the terminal apparatus can set the proportionality coefficient $k2$ of the zooming-in factor of the canvas according to the change in texture of the drawing pens before and after modifying the pen type. If the terminal apparatus detects that the user draws previously by using a pen type of a black common drawing pen and then uses a pen type of a color drawing pen with particular texture, the terminal apparatus triggers the function of intelligently zooming-in the canvas. The terminal apparatus can set different proportionality coefficients $k2$ according to the realization effects of the texture of the drawing pens before and after modifying the pen type. Wherein, proportionality coefficients for switching between different texture information can be preset. For example, a proportionality coefficient corresponding to the switchover from texture 1 to texture 2 and a proportionality coefficient corresponding to the switchover from texture 1 to texture 3 are preset. In addition, the terminal apparatus can also adjust the set proportionality coefficients in real time according to the content drawn by the user.

For the color information of lines before and after modifying the pen type/line color, the terminal apparatus can set a proportionality coefficient $k3$ of the zooming-in factor of the canvas according to the change in color of lines before and after the modification. If the terminal apparatus detects that the user draws previously by using a black line and then uses a color line, the terminal apparatus triggers the function of intelligently zooming-in the canvas. The terminal apparatus can set different proportionality coefficients $k3$ according to the realization effects of the line color. Wherein, proportionality coefficients for switching between different line colors can be preset. In addition, the terminal apparatus can also adjust the set proportionality coefficients in real time according to the content drawn by the user.

The terminal apparatus can determine the zooming-in factor only according to the modification to the parameters of the drawing pen. In this case, the terminal apparatus can calculate the zooming-in factor according to one of the determined proportionality coefficients, for example, $Ks=k1$, $Ks=k2$ or $Ks=k3$, or can also calculate the zooming-in factor according to a multiple of proportionality coefficients, for example, the final zooming-in factor of the canvas $Ks=k1\times k2\times k3$.

In addition, the terminal apparatus can also comprehensively determine the zooming-in factor according to the modification to the parameters of the drawing pen together with other information. In this case, the terminal apparatus can calculate an adjustment factor for the zooming-in factor according to one of the determined proportionality coefficients, for example, Ka=k1, Ka=k2 or Ka=k3, or can also calculate an adjustment factor for the zooming-in factor according to a multiple of proportionality coefficients, for example, Ka=k1×k2×k3.

2. Information about the drawing content corresponding to the drawing focus

The terminal apparatus can determine the content to be drawn by the user, i.e., the drawing content corresponding to the drawing focus, according to the drawing focus of the user, and then determine the zooming-in factor Ks of the current canvas or the adjustment factor Kb for the zooming-in factor of the current canvas according to the information about the content to be drawn.

Wherein, the information about the drawing content corresponding to the drawing focus comprises at least one of the following: the thickness of lines of the drawing content, the density of lines of the drawing content, the shape of lines of the drawing content, the proportion of the drawing content in a canvas, the proportion of the drawing content in a canvas region displayed on the terminal screen, historical processing information of the drawing content, and historical processing information of a drawn content associated with the drawing content.

a. The terminal apparatus can determine the zooming-in factor Ks of the current canvas or the adjustment factor Kb for the zooming-in factor of the current canvas according to the thickness of lines, the density of lines, and the shape of lines of the content to be drawn. If the lines of the drawing content are thinner and denser, it is required to increase the zooming-in factor; or otherwise, the zooming-in factor should be decreased.

As shown in FIG. 8A, if the user draws a delicate part, such as eyes or feather of an animal, and the lines are very thin and dense, it is required to properly increase the zooming-factor of the canvas, so that it is more convenient for the user to draw detail information. As shown in FIG. 8B, if the user draws lotus leaves, since the veins of the lotus leaves have a lot of slender lines, the canvas region displayed on the screen will become smaller if the zooming-in factor is too large, which is disadvantageous for drawing long lines. Thus, it is required to properly decrease the zooming-in factor of the current canvas. Therefore, it is also required to adjust the zooming-in factor of the canvas with reference to the shape and region of the drawing content. When the lines are slender, the zoom scale of the current canvas is properly decreased.

b. The terminal apparatus can determine the zooming-in factor Ks of the current canvas or the adjustment factor Kb for the zooming-in factor of the current canvas according to the proportion of the content to be drawn in the whole canvas or the proportion of the content to be drawn in the canvas region currently displayed on the terminal screen.

For example, if the terminal apparatus detects that the proportion of the content to be drawn in the canvas region currently displayed on the screen is less than a preset threshold, the system can determine the proportionality coefficient Kb according to the proportion of the drawing content in the canvas region currently displayed on the screen and the proportion of the canvas currently displayed on the screen in the whole canvas, so as to properly increase the zooming-in scale of the drawing content.

c. The zooming-in factor Ks of the current canvas or the adjustment factor Kb for the zooming-in factor of the current canvas is determined according to the historical processing information of the content to be drawn.

For example, when the user uses the terminal apparatus to draw, the user often needs to view the overall effect of a drawn part after drawing for several strokes, and then continues to draw or modifies the drawn part. Upon detecting a user's operation of raising the pen, the terminal apparatus records processing information (including a zoomed-in state) of the drawing content corresponding to the drawing focus before the operation of raising the pen. After the terminal apparatus detects a user's operation of raising pen or an operation of hovering the drawing pen and if the positioned drawing focus is consistent with the drawing focus before raising the pen, the terminal apparatus can determine a zooming-in factor when intelligently zooming-in the current canvas after bringing a pen down, according to the processing information corresponding to the drawing content before raising the pen. Wherein, the zooming-in factor corresponding to the drawing content before raising the pen can be regarded as the zooming-in factor when intelligently zooming-in the current canvas after bringing a pen down.

d. The terminal apparatus determines the zooming-in factor Ks of the current canvas or the adjustment factor Kb for the zooming-in factor of the current canvas according to the processing information of the drawn content associated with the content to be drawn.

Wherein, the association mode can be similar content or other association modes.

The historical processing information can include, but not limited to, a zoomed-in state of the drawn content, for example, a zooming-in factor.

For example, if the terminal detects that it is the first time for the user to draw the details of object A, the system will automatically search whether the drawn content has a drawing object similar to this drawing object. If there is a drawn object B similar to the object A, the zoomed-in state of the canvas when drawing the object B is acquired. If no manual operation is performed when drawing the object B, an adjustment factor Kb for the zooming-in factor of the canvas is calculated according to the zooming-in factor intelligently calculated by the system when drawing the object B and a size ratio of the object A and the object B. If the terminal apparatus detects that the user performs a manual zooming operation when drawing the object B, an adjustment factor Kb for the zooming-in factor of the current canvas is set according to the zooming-in factor of the canvas after the manual adjustment.

The terminal apparatus can determine the zooming-in factor only according to the content to be drawn. In addition, the terminal apparatus can also comprehensively determine the zooming-in factor according to the content to be drawn and other information. In this case, the terminal apparatus can determine an adjustment factor Kb for the zooming-in factor.

3. The distance from the drawing pen to the terminal apparatus

Due to different distances from the drawing pen to the terminal apparatus, the zoom scale of the canvas may be different. The smaller the distance from the drawing pen to the terminal apparatus is, the finer the content displayed by the canvas is, that is, the larger the zoom-in scale of the canvas is. Thu, the zoom-in scale factor Kc is set to be inversely proportional to the distance. The zoom-in scale of the canvas changes with the change in the distance from the drawing pen to the terminal apparatus.

By detecting the height from the drawing pen to the terminal screen, the terminal apparatus sets different canvas zoom-in scales. Since the zoom-in scale of the canvas is inversely proportional to the height from the drawing pen to the terminal screen and the zoom-in scale linearly changes with the height from the drawing pen to the terminal screen, the zoom-in scale of the canvas can also be set to non-linearly change with the height from the drawing pen to the terminal screen, so that the drawing content zoomed-in along with the continuous change of the height of bringing a pen down of the user is displayed on the terminal screen. As described above, the distance from the drawing pen to the terminal can be obtained by automatically selecting the best communication mode according to the electricity quantity or network condition, or can be obtained by a wearable device.

4. The speed of bringing a pen down

When the user brings a pen down slowly, the user generally wants to gradually view the drawing content, and in this case, a smaller zoom-in scale factor Kd can be set. When the speed of bringing a pen down is fast, the user generally wants to zoom-in quickly for drawing, and in this case, a larger zoom-in scale can be set. The zoom-in scale of the canvas can also change with the change in the speed of bringing a drawing pen down.

5. The size of the terminal screen

Different terminal apparatuses have different screen sizes, so the desired zoomed-in state may be different when the user draws the same detail information on different terminal apparatus by using drawing applications. For example, zooming-in may not be required when drawing on a table computer, while zooming-in is required when drawing on a mobile phone. Therefore, to make the user have the same experience in drawing the content of a same detailed degree, after the function of intelligently zooming-in the canvas is triggered, it is required to correspondingly adjust the zooming-in factor of the canvas according to the screen size of a terminal apparatus. In other words, an adjustment factor Ke for the zooming-in factor of the current canvas is determined according to the specific size of the screen of a terminal apparatus.

For example, if the screen sizes of terminal apparatuses of three different types are s1, s2 and s3, respectively, the determined corresponding canvas zoom scales are k1, k2 and k3, respectively. Initially, the size of a canvas is the same as the screen size of a terminal apparatus, and the zoom scale of the canvas is 1. When the terminal apparatuses trigger the function of intelligently zooming-in the canvas, in order to make the user have the same user experience in drawing the same detail on different terminals, it is required to zoom-in the canvas to a same size, and the zooming-in factor of the canvas shall satisfy the following equation:

$$k1:k2:k3 = \frac{1}{s1}:\frac{1}{s2}:\frac{1}{s3}.$$

One terminal can be selected as are reference. That is, Ke of this apparatus is set as Ke=1. If it is assumed that Ke1=1, then $$Ke2 = \frac{s1}{s2} \text{ and } Ke3 = \frac{s1}{s3}.$$

Further, a terminal apparatus can also respectively acquire an adjustment factor for the zooming-in factor according to each piece of information among multiple pieces of information, and then determine a final zooming-in factor of the canvas according to each acquired adjustment factor for the zooming-in factor. For example, if the determined adjustment factors for the zooming-in factor are Ka, Kb and Kc, the final zooming-in factor of the canvas is: Ks=Ka×Kb×Kc.

After intelligently zooming-in the canvas according to the zooming-in factor, the terminal apparatus can trigger a function of moving a display position of the drawing focus. Wherein, after zooming-in the canvas, the positioned drawing focus of the user can be moved to a preset position of the terminal screen for displaying, for example, moved to the middle of the screen, so that it is convenient for the user to position the drawing focus in the zoomed-in canvas.

In addition, it is also possible to move the display position of the drawing focus of the user, to correspond the drawing focus to the mapping position of the drawing pen on the terminal screen. In this case, without moving the position of bringing a pen down, the user can directly draw content on the zoomed-in canvas.

This embodiment of the present disclosure proposes that the function of moving the display position of the drawing focus can be executed every time after the zooming-in is executed. For example, every time after the canvas is intelligently zoomed-in, the terminal apparatus will move the display position of the drawing focus to correspond to the position of bringing a pen down.

If the user raises the pen to view the overall effect and then brings the pen down to draw the detail content continuously, the terminal apparatus can also execute the processing of intelligently zooming-in the current canvas. Therefore, the terminal apparatus will move the display position of the drawing focus to correspond to the position of bringing a pen down.

During executing the zooming-in of the current canvas, the zooming-in can be executed in the following two ways.

1. The zooming-in is executed gradually along with the distance from the drawing pen to the terminal screen.

If the user holds the drawing pen to approach to the terminal screen and the position of bringing a pen down is a position to be finely drawn by the user, the terminal apparatus continuously zooms-in the canvas as the distance from the drawing pen to the screen decreases continuously, where the zooming-in factor during zooming-in the canvas is related to the distance from the drawing pen to the screen. The terminal apparatus uses the initial position of bringing a pen down as the drawing position of the user, or uses a local region of the initial position of bringing a pen down as the drawing region of the user. The drawing position and the drawing region of the user are regarded as the drawing focus of the user.

During zooming-in the canvas, the drawing focus can be always displayed in the middle of the screen, or the drawing focus is always corresponding to the position of bringing a pen down of the drawing pen.

When the user considers that the zoom-in scale of the canvas is proper, the relative movement between the drawing pen and the screen can be stopped, that is, the distance from the drawing pen and the screen remains unchanged. If this state lasts for a period of time, the terminal apparatus can confirm that it is not needed to continuously zoom-in the canvas, and the user can move the canvas to adjust the display position of the canvas.

During the zooming-in process, the zooming-in factor for zooming-in the canvas can be determined according to the distance from the drawing pen to the screen, or can also be comprehensively determined according to the distance and other information.

2. The zooming-in is executed in two steps.

When the user has sketched the overall contour and wants to draw finely, since the proportion of the content to be finely drawn by the user in the canvas may be very small, it is difficult for the user to directly select a position to be drawn. In this case, the terminal apparatus can execute zooming-in twice.

First zooming-in: the user can hold the drawing pen to approach to the terminal screen, and the position of bringing a pen down is within a region of the position to be finely drawn by the user, so the terminal apparatus automatically recognizes an object to be drawn by the user according to the position of bringing a pen down after detecting an event of bringing a pen down, and then displays this object on the terminal screen. Subsequently, the user can confirm that he/she wants to draw this object finely through some processing, for example, by voice and/or a gesture, such as clicking this object, etc. The terminal apparatus uses a region corresponding to this object as a drawing region, i.e., a drawing focus of the user, then zooms-in the canvas after determining the zooming-in factor, and displays the zoomed-in drawing region in the middle of the screen.

Second zooming-in: in the zoomed-in canvas, the user can accurately select a position to be finely drawn. At this time, the user can drop the drawing pen towards the position to be drawn and then hover the drawing pen. Meanwhile, the terminal apparatus will again use the hovering position as a drawing position, i.e., a drawing focus, then zoom-in the canvas again after determining the zooming-in factor, and display the drawing position in the middle of the screen when displaying the zoomed-in canvas.

In the zooming-in processes, the drawing content corresponding to the position selected by the user during the second zooming-in differs from the content of the drawing object during the first zooming-in, in terms of the thickness/density/shape of the corresponding lines, the proportion of the drawing content in the whole canvas, and the zoomed-in state of the similar drawn content. Therefore, the zooming-in factor of the second zooming-in is greater than that of the first zooming-in.

The foregoing description is merely exemplary description of the zooming-in, and the specific implementations of the zooming-in of this embodiment include but are not limited to the two ways. During the specific implementation, the zooming-in can be executed in a corresponding way if appropriate, and the specific execution way is not intended to limit the method of the present disclosure.

Hence, when the user starts to draw details of objects one by one after sketching the contour, the terminal apparatus automatically captures an interaction event or a target drawing part, then zooms-in a canvas on this basis, and automatically positions the drawing focus to a local region or position to be drawn by the user. In this way, the user's operations of manually dragging the canvas and zooming-in the canvas are avoided, the flexibility of using the terminal apparatus to draw content by the user is improved, and the user experience is improved.

Since the zooming-in factor of the canvas calculated by the terminal apparatus in a preset way may not conform to drawing habits of some users, the terminal apparatus allows a user to interrupt/close the function of intelligently zooming-in the current canvas if needed. In other words, in the process of the terminal apparatus in triggering and executing the zooming-in of the current apparatus, when a user considers that a zooming-in factor of the canvas has satisfied the drawing demands of the user, the user can also close the function of intelligently zooming-in the current canvas by interrupting the continuous execution of intelligently zooming-in the current canvas of the terminal apparatus in some interaction ways. The interruption event will also trigger the terminal apparatus to record the zooming-in factor of the canvas at this time, for the purpose of adjusting the zooming-in factor calculated during the subsequent process of intelligently zooming-in the canvas, so as to become more conform to the operation habits of the user.

Further, the user can also realize the interruption/closing of the function of intelligently zooming-in the current canvas in any one or any combination of voice, a key, a gesture, an external controller or other interaction ways. For example, the user can control the interruption/closing of the function of intelligently zooming-in the current canvas by setting a voice instruction "Interrupt the zooming-in function" or "Close the zooming-in function", or by a control command in the drawing software, or by rolling, shaking, multi-finger operation or other gestures, or by some conventional operations to an external controller, etc. In addition, the terminal apparatus will automatically detect an operation of the user and then automatically interrupt the intelligent zooming-in. For example, when the terminal apparatus triggers the function of intelligently zooming-in the current canvas and is executing the process of zooming-in the current canvas, upon detecting that the screen of the terminal apparatus is quickly clicked by a finger of the user or the drawing pen quickly drops toward the screen, the terminal apparatus considers that the user wants to interrupt the intelligent zooming-in of the current canvas, and thus interrupts the zooming-in. All other intelligent processing described hereinafter can be interrupted/closed by the user at any time, which will not be repeated hereinafter.

II. Zooming-out

If a canvas is very large and after a user has supplemented details of a certain object, the user generally needs to zoom-out the canvas to view the overall effect of the drawn details, and after viewing, the user needs to return to the previously drawn position for modification or continuing to draw. In conventional systems, the user needs to zoom-out a canvas by a gesture, then drag the canvas to a region to be viewed, manually move the canvas to the previously drawn region after viewing, and zoom-in the canvas for modification or continuing to draw by a gesture. Thus, the operations of the user are very tedious.

This embodiment of the present disclosure proposes that, after the user has supplemented the details, a terminal apparatus can automatically zoom-out the canvas and display a region related to the previously drawn content to view the overall drawing effect, and automatically zoom-in the canvas according to the previous zoomed-in state after the user has viewed the overall drawing effect.

For instance, when a user fills the details, the user usually expects to view the overall effect of the drawn part, for example, whether the color is harmonious or whether the density of lines is appropriate. In this case, the user can raise the drawing pen and then calculate a zoom scale according to the distance from the drawing pen to the terminal, and in this way, the user can gradually view the display effect of the drawn part within a related region so as to decide whether to perform modification thereto. When the user continues to draw or modify after viewing the overall drawing effect or being interrupted by an unexpected event such as an incoming call or message, and when the pen drops toward the previously drawn position on the screen, a drawing focus is automatically brought to be corresponding to the position of bringing a pen down, so that the user's tedious operation of manually finding the drawing focus is avoided.

As shown in FIG. 9, when the user is drawing eyes of a bird and if the user expects to view whether the position, color and line of the drawn eyes are harmonious with the head of the bird, the user can slightly raise the drawing pen, where the distance from the drawing pen to the terminal apparatus corresponds to the distance d1 in FIG. 9; then, the canvas will be automatically zoomed-out to present a head region having a large correlation with the eyes of the bird. If the user needs to perform modification or continue to draw, the focus of bringing a pen down is automatically positioned to the previously drawn position when the drawing pen is moved to the drawing position before raising the pen and then hovered. If the user thinks that the displayed region is too small and wants to view the effect of the eyes in the whole body, the user raises the pen again, where the distance from the drawing pen to the terminal apparatus corresponds to the distance d2 in FIG. 9, so that the canvas will be zoomed-out again and the whole body of the bird will be presented. The zoom scale of the canvas will be automatically adjusted by the canvas according to the height of raising the pen. When the distance from the pen to the terminal reaches a certain value, the whole canvas will be displayed on the screen.

Figure 10:
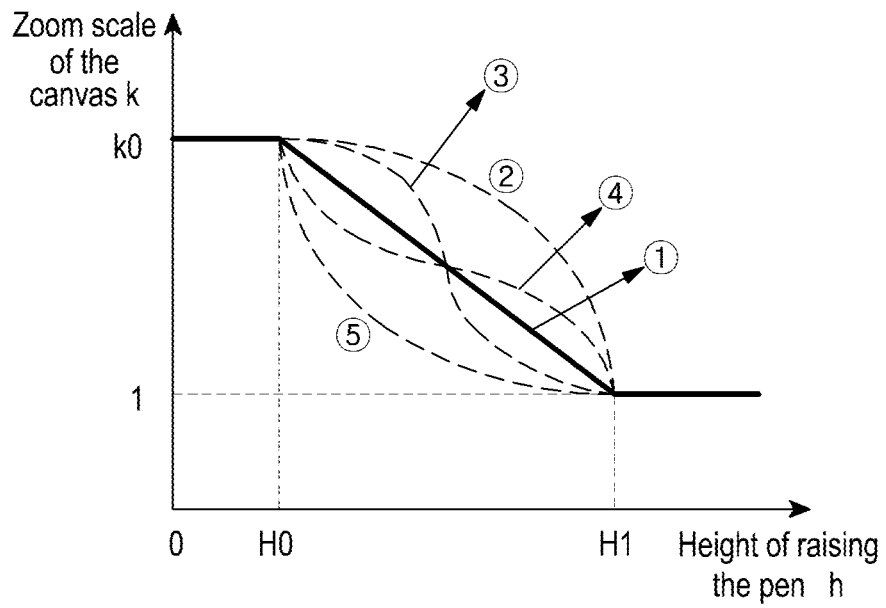
FIG. 10 is a schematic coordinate diagram of a change in the zoom scale of a canvas along with the height of raising the pen, according to an embodiment of the present disclosure.

FIG. 10 is a schematic diagram of the change in the zoom scale of the canvas along with the height of raising the pen (the distance from the drawing pen to the terminal apparatus) during raising the pen for viewing the overall drawing effect, wherein k0 is the zoom scale of the canvas during current drawing, H0 is the height of raising the pen when the intelligent zooming-out of the current canvas is triggered, and H1 is a maximum response height of the event of raising the pen. When the height of raising the pen reaches or exceeds H1, the zoom scale of the canvas is 1, which is equal to the size of the terminal screen.

Specifically, the process of intelligently zooming-out the current canvas can be triggered in at least one of the following ways.

1. A user's operation of raising the pen

When the user wants to view the overall effect after supplementing the details, the general processing is raising the drawing pen, so that the terminal apparatus triggers a function of intelligently zooming-out the current canvas according to the detected event of raising the drawing pen. As shown in FIG. 10, when the terminal detects that the height from the drawing pen to the terminal screen is less than H0, it is considered that the user is drawing a detail part; and when the terminal detects that the height from the drawing pen to the terminal screen reaches H0, it is considered that this is a user's event of raising the pen.

Due to different heights of raising the pen, the range to be viewed by the user is different and the display range on the terminal screen is also different, so that the event of raising the drawing pen triggers the function of intelligently zooming-out the canvas. Wherein, the terminal apparatus can detect a distance from the drawing pen to the terminal apparatus. When the distance from the drawing pen to the terminal apparatus reaches a preset trigger distance, the terminal apparatus detects an event of raising the pen. After triggering the intelligent zooming-in function, the terminal apparatus will automatically lock the function of intelligently zooming-out the current canvas, and will automatically quit the locking mode when there is a drawing operation. In other words, if the user does not draw anything after the terminal apparatus executes the function of intelligently zooming-in the canvas, and when the terminal apparatus detects an event of raising the drawing pen, the terminal apparatus considers that it is not required to trigger the function of intelligently zooming-out the current canvas.

2. User instruction.

The user can send an instruction of intelligently zooming-out a canvas by one or any combination of voice, a gesture, a key, an external controller or other interaction ways, and the terminal apparatus triggers the function of intelligently zooming-out the canvas after detecting the instruction of intelligently zooming-out the canvas. For example, the user can activate an instruction "Zoom-out the canvas" by preset voice, or by long pressing the volume key "−", or by a control button in the drawing software, or by any one or any combination of touching the screen with multiple fingers, shaking/rolling/tilting the terminal, etc. The user can also activate by a drawing pen, a wearable device or other external controllers.

3. Historical processing information of the drawing content corresponding to the drawing focus The terminal apparatus determines whether to trigger the function of intelligently zooming-out the current canvas according to the historical processing information (including a zoomed-in state) of the current drawing content (i.e., the drawing focus). If it is detected the current drawing content is a content displayed after zooming-in, that is, the current canvas is in the zoomed-in state, the function of intelligently zooming-out the current canvas can be triggered. Otherwise, if the current canvas is not zoomed-in, it is not required to trigger the function of intelligently zooming-out the current canvas.

During the zooming-out of the current canvas, it is required to execute zooming-out according to a corresponding zoom-out factor so that the zoomed-out canvas meets the user's demands. In this embodiment of the present disclosure, the zoom-out factor for executing the zooming-out is determined by at least one of the following.

1. The distance from the drawing pen to the terminal apparatus

Due to the different distances from the drawing pen to the terminal apparatus, the zoom scale of the canvas is different. The larger the height of raising the drawing pen is, the larger the region displayed by the canvas is, and the smaller the zoom scale of the canvas is. Therefore, the zoom scale factor Ka of the canvas can be set to be reversely proportional to the distance.

By detecting the height from the drawing pen to the terminal screen, the terminal apparatus sets different zoom scales for the canvas. As shown in path $\hat{1}$ in FIG. 10, the zoom scale of the canvas is reversely proportional to the height of raising the drawing pen, and the zoom scale is reduced linearly. In this case, the zoom scale of the canvas is as follows:

$$k = k0 + (1-k0)\frac{h-H0}{H1-H0}.$$

The zoom scale of the canvas can also be set to be reduced non-linearly, for example, paths $\hat{2}, \hat{3}, \hat{4}$ and $\hat{5}$ in FIG. 10. One or more optimal modes can be selected, so that the overall drawing effect of the drawing content in different levels are displayed on the terminal screen according to the height of raising the pen by the user. As described above, the distance from the drawing pen to the terminal can be obtained by automatically selecting the best communication mode according to the electricity quantity or network condition, or can be obtained by a wearable device.

2. The speed of raising the pen

When the user raises the pen slowly, the user generally wants to gradually view the drawing content within a smaller region, and in this case, a smaller zoom scale adjustment factor Kb can be set. When the speed of bringing a pen down is fast, the user generally wants to quickly view the overall effect within a larger region, and in this case, a larger zoom scale adjustment factor Kb can be set.

3. Historical processing information of the drawing content corresponding to the drawing focus After triggering the function intelligently zooming-out the current canvas, the terminal apparatus needs to set an adjustment factor Kc according to the zoomed-in state of the current drawing content (i.e., the drawing content corresponding to the drawing focus) for adjusting the zoom scale of the current canvas. In FIG. 10, if the zooming-in factor K0 of the current drawing content is large, the zooming-out speed of the canvas shall be properly quickened during calculation of the zoom scale of the current canvas, so that the current canvas can be zoomed-out to a preset size when a preset height is reached. Otherwise, if the zooming-in factor K0 of the current drawing content is not large, the zooming-out speed of the current canvas shall be slowed down when zooming-out the current canvas, so that it is convenient for the user to gradually view the drawing effects in various levels. Therefore, it is possible to set an adjustment factor Kc in reverse proportion to the zooming-in factor of the current drawing content, for adjusting the zooming-out speed of the current canvas.

4. Correlation with the drawing content corresponding to the drawing focus

After triggering the function of intelligently zooming-out the canvas, the terminal apparatus sets a zoom scale adjustment factor Kd ($0<Kd<1$) according to the correlation with the current drawing content for adjusting the zoom scale of the canvas. The correlation includes at least one of the following: temporal correlation, spatial correlation, drawing object correlation, and style correlation.

The spatial correlation is the most direct method for calculating the correlation. The terminal apparatus can expand to the surrounding regions by taking a drawing region (a region of the drawing focus) as a center, and then calculate the spatial correlation of these regions with the drawing region according to the distance.

The temporal correlation is the time length from the time of completing drawing over the surrounding regions of the drawing region to now. The temporal correlation can be used as an auxiliary method for calculating the correlation. The user generally starts to continuously draw from an initial position, so the terminal apparatus can consider that a region having a short time interval from the drawing region shall be greatly correlated with the drawing region and thus shall be preferably displayed on the screen.

For the drawing object correlation, the terminal apparatus can distinguish an object from a background region from the angle of the content of the drawing content. For example, if eyes of an animal are being drawn, the head and the body have the highest correlation by calculation successively, so that the head is automatically regarded as an entirety in a local region on the canvas, and the effect of the eyes on the head can be thus viewed. Then, the canvas is zoomed-out again, and the body is regarded as an entirety to view.

For the style correlation, the terminal apparatus can calculate the style correlation according to the similarity in the hue, gray scale, lines, density of pixels, or more of the current drawing region.

5. The size of the terminal screen

Due to different screen sizes of different terminal apparatuses, in order to make the user have the same user experience in drawing by using different terminal apparatuses, a zoom scale adjustment factor Ke of the current canvas is set according to the size of a terminal screen. In other words, when the user is drawing the same detail content, the display size of the drawing content on a mobile phone is the same as that on a tablet computer. When the user raises the pen to view the overall effect, and if the height of raising the pen reaches the same preset threshold, the canvas should be zoomed-out to the size of the terminal screen, that is, the zoom scale is 1.

Figure 11:
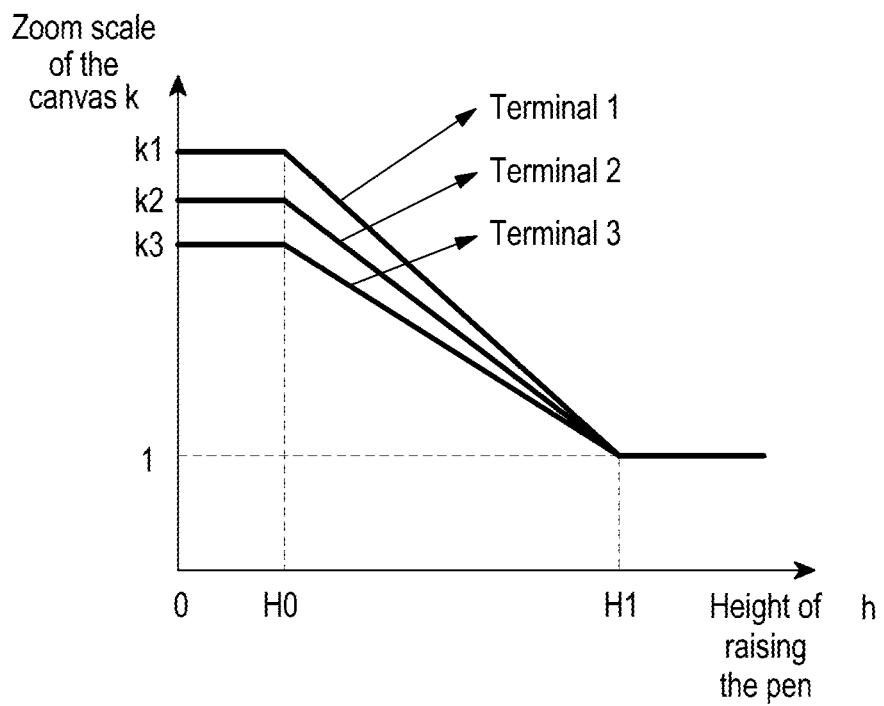
FIG. 11 is a schematic coordinate diagram of a change in the zoom scale of canvases along with the height of raising the pen, on different terminal apparatuses, according to an embodiment of the present disclosure.

In FIG. 11, when the same detail content are drawn on different terminal apparatuses, the zooming-in factors K0 of current canvases are different. When a terminal triggers the function of intelligently zoom-out the current canvas, the curved paths of decreasing the canvas zoom scale from K0 to 1 are different. For example, if it is assumed that the screen sizes of terminal apparatuses of three different types are s1, s2 and s3, respectively, the corresponding canvas zoom scales are k1, k2 and k3, respectively. When the canvases are zoomed-in to the same size, the following equation should be satisfied:

$$k1{:}k2{:}k3 = \frac{1}{s1}{:}\frac{1}{s2}{:}\frac{1}{s3}.$$

In other words, k0 is reversely proportional to the size of the terminal screen. If the size relation of the three terminal screens satisfies s1<s2<s3, then k1>k2>k3, so that the change relation of the canvas zoom scale and the height of raising the pen on the three terminal apparatuses is as shown in FIG. 11. The smaller the size of a terminal screen is, the faster the speed of decreasing the canvas zoom scale is. The adjustment factor Ke for the canvas zoom scale can be set to be proportional to the size of a terminal screen. If the zoom scale coefficient of terminal apparatus 1 is Ke1=1, the zoom scale coefficients of the latter two types of terminal apparatuses are $$Ke2 = \frac{s1}{s2}Ke1 \text{ and } Ke3 = \frac{s1}{s3}Ke1.$$

Furthermore, according to the distance from the drawing pen to the terminal apparatus, the speed of raising the pen, the historical processing information of the drawing content corresponding to the drawing focus, the correlation with the drawing content corresponding to the drawing focus and the size of the terminal screen, the zoom scale adjustment factors Ka, Kb, Kc, Kd and Ke of the canvas can be obtained from the zooming-out factor of the current canvas, and then the final zoom scale of the canvas is obtained: Ks=Ka×Kb×Kc×Kd×Ke.

After the terminal apparatus intelligently zooms-in the current canvas, it is also required to determine the drawing content displayed on the terminal screen, so that a canvas region to be displayed on the terminal screen can be determined.

The drawing content to be displayed on the terminal screen can be determined according to the correlation with the drawing content corresponding to the drawing focus. After the user has supplemented details to a certain object, the user generally wants to view the overall effect of the currently drawn detail in this object. Therefore, it is significant that the content having large correlation with the current drawing content (i.e., the drawing content corresponding to the drawing focus) can be preferably displayed, and in doing so, the viewing effect of the user is best. As shown in FIG. 9, when the user raises the pen slightly, the whole body of the bird can be displayed, and the user can view the overall effect of the drawing region. At this time, the detailed information of the drawing part still can be viewed. It is easier to view the effect. When the user raises the pen again, the effect of the bird in the whole environment will be displayed until the whole canvas is displayed on the screen.

In addition, the drawing content to be displayed on the terminal screen can also be determined according to the selection mode of the drawing focus. When the terminal apparatus triggers the function of intelligently zooming-out the current canvas, the selection mode of the current drawing focus can be preferably considered. The drawing focus can be selected by circling, clicking or other operations, as described above. If the terminal apparatus detects that the user selects a drawing focus by directly circling it, the drawing intention of the user is very clear, and in this case, the region circled by the user is preferably determined to be displayed on the screen.

The terminal apparatus can display, in the middle of the terminal screen, the drawing content determined to be displayed on the terminal screen, so that it is convenient for the user to better view the overall effect.

Hence, after the user has supplemented the detail part, the canvas is zoomed-out automatically according to the distance from the drawing pen to the terminal apparatus and the canvas region is displayed according to the correlation of the drawing content, so that the user can view the overall effect of the drawn part without manual zooming and dragging operations.

III. Moving the display position of the drawing focus

After intelligently zooming-in the canvas, the terminal apparatus can trigger a function of moving the display position of the drawing focus. Wherein, after the canvas is zoomed-in, the positioned drawing focus of the user can be moved to a preset position of the terminal screen for displaying, for example, moved to the middle of the screen, so that it is convenient for the user to position the drawing focus in the zoomed-in canvas.

In addition, it is also possible to move the display position of the drawing focus of the user, to correspond the drawing focus to the mapping position of the drawing pen on the terminal screen. In this case, without moving the position of bringing a pen down, the user can directly draw content on the zoomed-in canvas.

This embodiment of the present disclosure proposes that the function of moving the display position of the drawing focus can be executed every time after the zooming-in is executed. For example, every time after the canvas is intelligently zoomed-in, the terminal apparatus will move the display position of the drawing focus to correspond to the position of bringing a pen down.

If the user raises the pen to view the overall effect and then brings the pen down to draw the detail content continuously, the terminal apparatus can also execute the processing of intelligently zooming-in the current canvas. Therefore, the terminal apparatus will move the display position of the drawing focus to correspond to the position of bringing a pen down.

Due to the limited screen of the terminal apparatus, when the user uses the terminal apparatus to draw, the user often needs to view the overall effect of a drawing part after drawing for several strokes, and then continues to draw or modifies the drawn part. At this time, the usual processing is zooming-in the canvas and finding the position drawn before viewing. In this way, the drawing process will often be interrupted by these frequent processing. Therefore, in this embodiment of the present disclosure, after triggering the function of intelligently zooming-out the canvas, the terminal apparatus can determine a drawing intention of the user according to the position of bringing a pen down or the hovering position of the drawing pen.

The terminal apparatus may be interrupted sometimes. For example, it quits abnormally because of an incoming call, a message, or automatic power-off due to insufficient electricity. The terminal apparatus will record the states of the canvas and the pen before the interruption. After reentering, the terminal apparatus triggers the functions of intelligently zooming the current canvas and intelligently moving the display position of the drawing focus, so that the size and position of the canvas reenter the state before the interruption.

If the terminal apparatus detects the position of bringing a pen down or the hovering position of the drawing pen is within a drawing region before raising the pen/before the interruption, or if the position of bringing a pen down or the hovering position of the drawing pen is close to the drawing focus/distance before raising the pen/before the interruption, the terminal apparatus triggers the functions of intelligently zooming the current canvas and intelligently moving the display position of the drawing focus. At this time, the drawing focus is a drawing focus before raising the pen/before the interruption.

The terminal apparatus can directly acquire the zoom scale of the canvas during previously drawing the drawing content corresponding to the drawing focus, and then automatically zoom-in or zoom-out the canvas to the size of the previous drawing on this basis.

At this time, the terminal apparatus can move the drawing focus to a preset position of the terminal screen for displaying. By moving the display position of the drawing focus of the user, the drawing focus is brought to be corresponding to the mapping position of the drawing pen on the terminal screen.

Hence, when the user needs to continue to supplement details after viewing the drawing effect or being interrupted by an unexpected event such as an incoming call or a message, or needs to reenter after the drawing is interrupted unexpectedly, the canvas can be automatically zoomed-in according to the distance from the drawing pen to the apparatus, and the drawing focus is positioned to the previously drawn position, so that it can be very convenient for the user to continue to draw, and the inconvenience resulted from continuous manual processing and the tedious processing of manually finding the drawing position by the user are avoided.

IV. Switching between drawing objects

This embodiment of the present disclosure proposes that, if the user first sketches the contours of drawing objects, the terminal apparatus can recognize the drawing objects according to the contour information, color information, line information or more drawn by the user and in conjunction with an image recognition technology, and then classify the drawing objects by calculating similarity. The drawing objects having a similarity reaching a preset threshold are classified into one category for use in the subsequent processing.

After the user has drawn details, there are two possibilities: 1) continuing to draw the current object; and, 2)

drawing the next object. Usually, the user first sketches the overall contour and then draws details of objects one by one. Meanwhile, during the drawing, the user usually selects to draw the objects of one category and then draws the objects of another category. Thus, when two similar objects are far from each other, the user needs to manually zoom-in and drag the canvas to find the drawing object.

In this embodiment of the present disclosure, after the user has sketched the complete overall contour, the terminal apparatus can automatically recognize each drawing object and calculate the similarity between two drawing objects. If the drawing objects in the drawing are far from each other, the terminal apparatus can provide an automatic switching function according to the detected drawing state of the user, so that the user can switch to the next drawing object conveniently. For example, while the user is drawing one object or after the user has drawn one object, the user can view the overall effect of this object by raising the pen. At this time, the canvas is still in the zoomed-in state, and the region displayed on the screen is merely a very small region on the whole canvas. If the object to be drawn by the user is far from the currently drawn object, the terminal can automatically switch to the next drawing object.

In addition, the terminal apparatus can also provide a switching button. If the user is satisfied with the current drawing and wants to switch to the next drawing object, the user can switch freely only by clicking the button NEXT.

Figure 12:
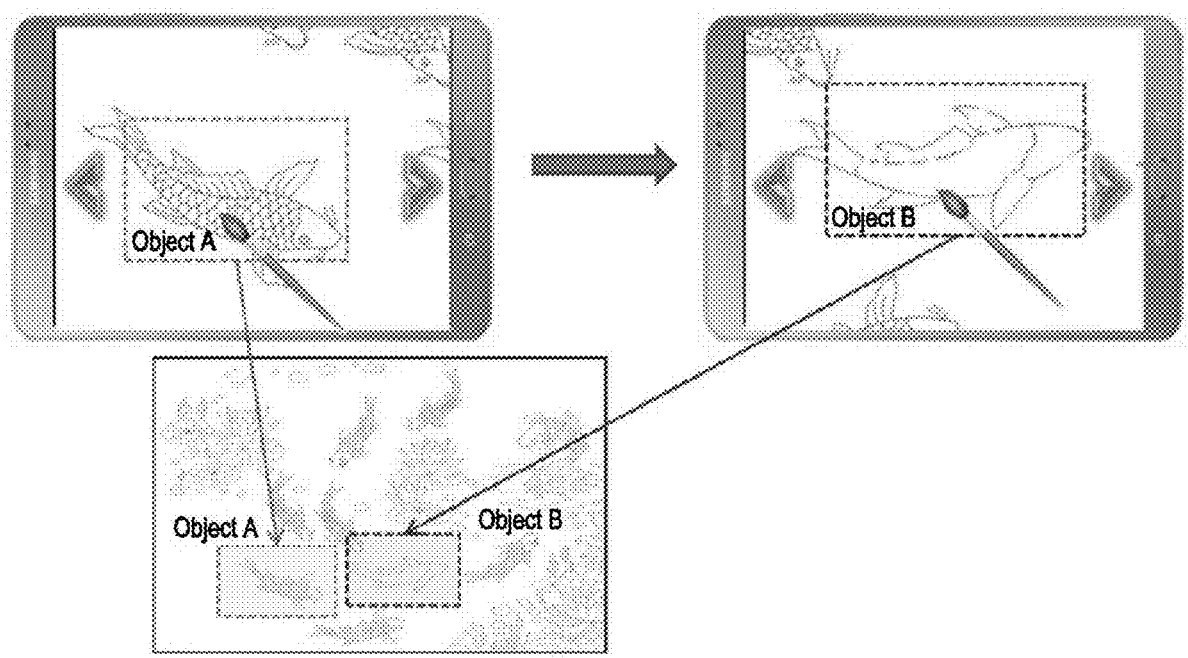
FIG. 12 is a schematic diagram of switching between drawing objects according to an embodiment of the present disclosure.

For example, the user is drawing several fish scattered in a lotus pond, and starts to supplement details one by one after sketching the layout. When the user has supplemented details to one fish and wants to switch to the next fish for supplementing details, the user can see the button for switching between objects after raising the pen to a preset height. As shown in FIG. 12, the user can view a drawing object recommended by the terminal directly by operating left and right switching buttons, and then select the next drawing object according to own drawing habits, for example, switching from the drawing object A to the drawing object B, so that the user can select to draw one fish having an approximate morphology. Thus, the time required for changing the pen and designing can be greatly reduced, and the efficiency and quality of drawing are improved.

Specifically, the function of intelligently switching between drawing objects can be triggered in at least one of the following ways.

1. A user's operation of raising the pen

When the user finishes the drawing of one object, the user will usually raise the drawing pen. Then, the terminal determines the intention of the user by detecting a user's event of raising the pen, and recommends drawing objects to be drawn for selection by the user, or directly switches to the next drawing object automatically. In other words, the terminal apparatus triggers the function of intelligently switching between drawing objects according to the detected event of raising the drawing pen.

The user's operation of raising the pen can be determined according to the distance from the drawing pen to the terminal screen. If the distance is greater than a preset threshold, it is considered as a user's event of raising the pen occurs. As described above, an event of raising the pen is also a trigger condition of the function of intelligently zooming-out the current canvas. After the user has drawn details, the user raises the pen to view the drawing effect. As described above, after raising the pen and viewing the effect, the user continues to draw or modifies the current drawing region (i.e., the region of the drawing focus before raising the pen); however, here, the user finishes the drawing of the current object after raising the pen and viewing the effect, and switches to the next drawing object. Upon detecting an event of raising the pen, the terminal apparatus triggers a corresponding event according to the position of bringing a pen down of the user. If the user brings the pen down within the current drawing region, that belongs to the condition described above, if the user brings the pen down on an object switching button, the terminal apparatus switches to the last or next drawing object according to the user's operation.

2. User instruction.

The user can send an instruction of intelligently switching between drawing objects by one or any combination of voice, a gesture, a key, an external controller or other interaction ways, and the terminal apparatus triggers the function of intelligently switching between drawing objects after detecting the instruction of intelligently switching between drawing objects. For example, the user can activate an instruction "Switch between drawing objects" by preset voice, or by long pressing the volume key/home key, or by a control button in the drawing software, or by any one or any combination of an air gesture, shaking/rolling/tilting the terminal, etc. The user can also activate the instruction by a drawing pen, a wearable device or other external controllers.

3. Similarity between drawing objects

The terminal can trigger the function of intelligently switching between drawing objects according to whether there is an object similar to the current drawing object among the current drawing objects, and the zoomed-in state of the current drawing object.

Before the user supplements the details one by one, the terminal apparatus recognizes objects and calculates the similarity between two drawing objects. After the terminal apparatus detects the current drawing object and if there is an object having a similarity higher than the preset threshold, the terminal apparatus can trigger the function of intelligently switching between drawing objects. If the similarity is less than the preset threshold, it is considered that there is no object similar to the current drawing object among the current drawing objects, and the function of switching between drawing objects will not be triggered.

4. Display position of a drawing object to be drawn

The terminal apparatus detects the display position of a drawing object to be drawn on the terminal screen. If it is detected that there are drawing objects to be drawn not within the display region of the terminal screen, the terminal apparatus triggers the function of intelligently switching between drawing objects. If it is detected that all the drawing objects to be drawn are within the display region of the terminal screen, the user can view all the drawing objects, and the terminal apparatus may not trigger the function of automatically switching between drawing objects.

5. Historical processing information of the drawing content corresponding to the drawing focus Wherein, the historical processing information of the drawing content corresponding to the drawing focus includes a zoomed-in state.

The terminal apparatus can determine whether to trigger the function of intelligently switching between drawing objects according to the zoomed-in state of the current drawing content (i.e., the drawing content corresponding to the drawing focus).

Figure 13:
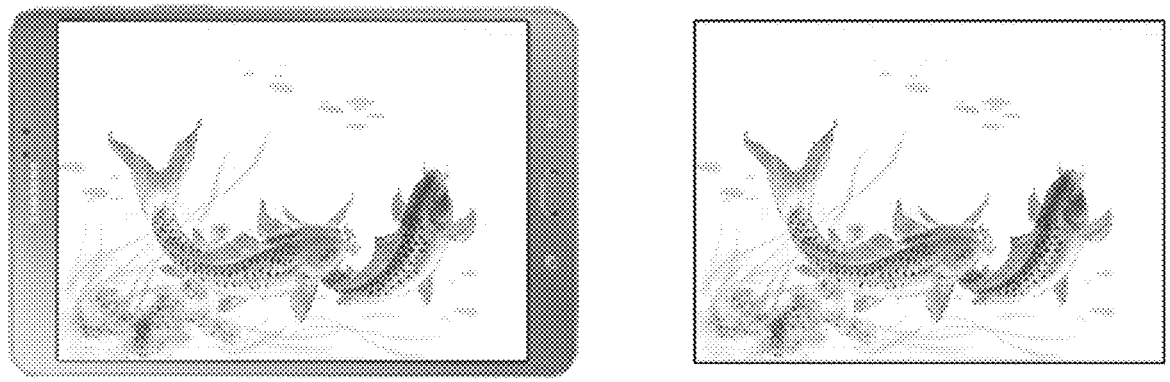
FIG. 13 is a schematic diagram of displaying the whole canvas on a terminal screen according to an embodiment of the present disclosure.

As shown in FIG. 12, if the current drawing content is in the zoomed-in state, some drawing objects to be drawn may not be within the display region of the terminal screen, so the terminal apparatus can trigger the function of intelligently switching between the drawing objects. As shown in FIG. 13, if the current drawing content is not zoomed-in, the region displayed on the screen is the whole canvas, and the user can view all the drawing objects, so the terminal apparatus may not trigger the function of automatically switching between the drawing objects.

Further, the terminal apparatus can recognize objects in the drawing, and calculate the similarity between the drawing objects. After the terminal apparatus triggers the function of intelligently switching between the drawing objects, a switched drawing object is determined according to at least one of the following: a distance between drawing objects corresponding to the drawing focus of the user, similarity between the drawing objects corresponding to the drawing focus of the user, and a user instruction.

The terminal apparatus can determine the switched drawing object according to the distance and/or similarity of the drawing objects corresponding to the drawing focus of the user, and then automatically execute an operation of switching between the drawing objects.

The terminal apparatus can also recommend a drawing object to be drawn according to the distance and/or similarity of the drawing objects corresponding to the drawing focus of the user, and then execute an operation of switching between the drawing objects according to the user instruction.

Specifically, after the user has sketched the contour, in accordance with some related algorithms in terms of the computer vision, the terminal apparatus can recognize majority of objects according to the contour shape. During the drawing, the recognition to some unrecognized objects will be added. The switched drawing object is determined according to the similarity between two objects, or a recommended order of switching between objects is determined according to the similarity between the objects. The terminal apparatus can obtain individual objects according to the contour sketched by the user, and then obtain the similarity between two objects according to the shape, lines, filling, texture, drawing part and drawing order of the recognized objects, so as to decide the switched drawing object or a priority order of recommending to switch between objects. When the objects have the same similarity, the switched drawing object or the recommendation order is determined according to the distance from the current drawing object, from the near to the distant.

For example, if the terminal apparatus has recognized four similar drawing objects A, B, C and D in the drawing and the object being drawn is A, and when the automatic switching between drawing objects is triggered, the terminal will automatically calculate distances d1, d2 and d3 from B, C and D to A and similarities r1, r2 and r3 between B, C, D and A. If d1=d2<d3 and r1<r2=r3, the recommendation order is r2, r3 and r1.

Furthermore, after the drawing objects are switched, the zoom scale of the canvas can be automatically adjusted according to the size of the switched drawing object, so that the switched drawing object is displayed on the screen in the optimal size. Thus, when the user views the switched drawing object, the whole drawing object can be viewed.

Therefore, when the user has drawn one object and the next object to be drawn is far, according to the result of the image recognition, similar objects can be classified by calculating the similarity of each drawing object, and the drawing objects are automatically switched during the drawing. Thus, the switchover of the drawing focus is realized, the user does not need to perform a series of operations such as manually zooming-out, dragging, zooming-in again, and the drawing efficiency of the user is improved.

V. Adjusting the resolution of the drawing content

Figure 14:
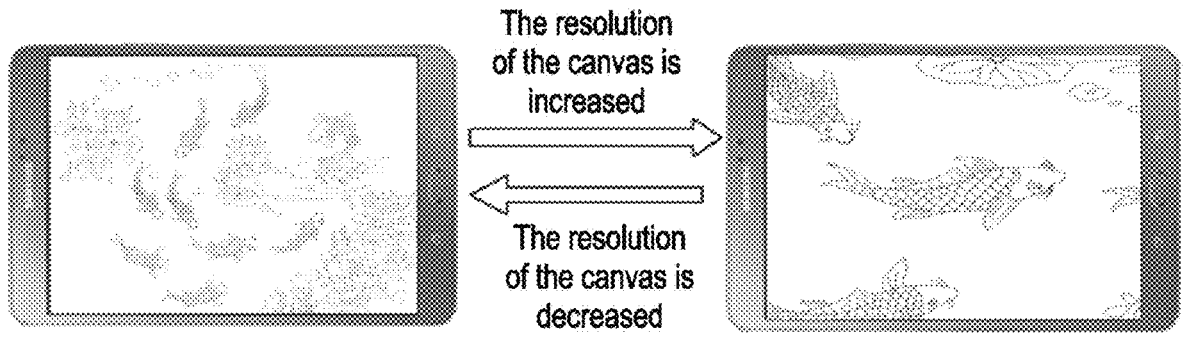
FIG. 14 is a schematic diagram of adaptively adjusting the resolution according to an embodiment of the present disclosure.
Figure 15:
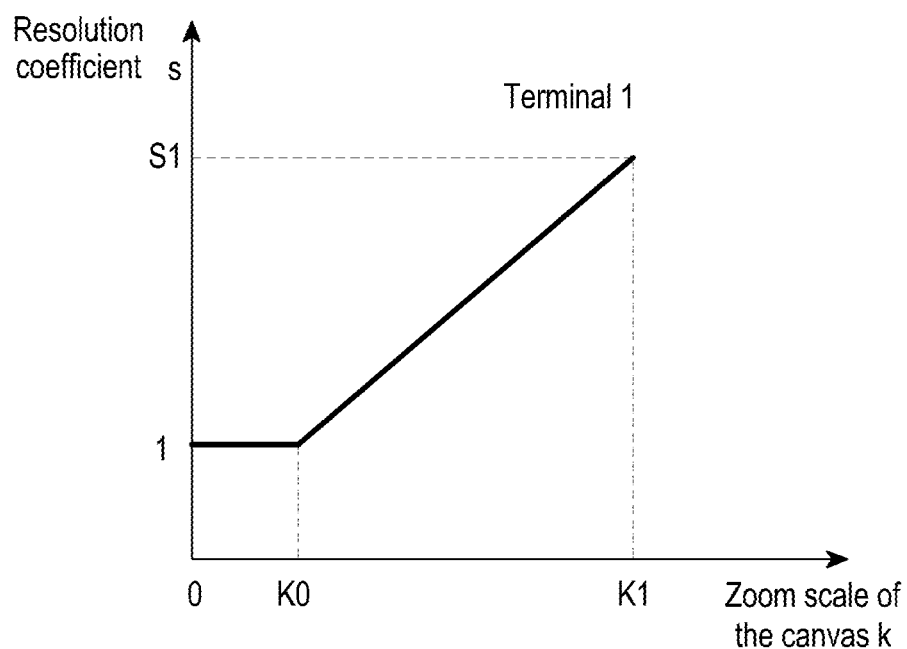
FIG. 15 is a schematic coordinate diagram of a relation between the resolution of the canvas and the zoom scale of the canvas according to an embodiment of the present disclosure.

As shown in FIG. 14, the focus positioning process is often accompanied with canvas zooming. If the resolution is low when the canvas is created initially, the display quality after zooming-in the canvas will be low. To meet different requirements of the user on the resolution of a canvas, in this embodiment of the present disclosure, the terminal apparatus can adaptively adjust the resolution of the canvas according to the zoom scale of the canvas, so that the display effect of the canvas is improved, and the resolution of the drawing content is also increased. After the resolution of the canvas is improved, the terminal allows the user to perform some local beautification operations.

By detecting a change in zoom scale of the canvas and/or a user instruction, the terminal apparatus determines that the user has the need of increasing the resolution. In this case, the terminal triggers a function of adaptively adjusting the resolution of the canvas, then automatically increases the resolution of the canvas, performs drawing at a high resolution subsequently, and adapts the low-resolution drawn content to the increased resolution.

Specifically, the process of adaptively adjusting the resolution of the canvas can be triggered in at least one of the following ways.

1. The change in zoom scale of the canvas

The display quality on the terminal screen is related to the zoom scale of the canvas. When the canvas is zoomed-in and if the solution of the canvas is not increased, the resolution of the display region on the terminal screen is decreased and the display quality of the canvas will become low. Therefore, the terminal apparatus can trigger the function of adaptively adjusting the resolution of the canvas according to the change in zoom scale of the canvas. In other words, when the zoom scale of the canvas is increased, the function of automatically increasing the resolution of the canvas of the terminal is triggered; and when the zoom scale of the canvas is decreased, the function of decreasing the resolution of the canvas of the terminal is triggered, so that the quality of drawing is improved.

2. User instruction.

The user can send an instruction of adaptively adjusting the resolution of the canvas by one or any combination of voice, a gesture, a key, an external controller or other interaction ways, and the terminal apparatus triggers the function of adaptively adjusting the resolution of the canvas after detecting the instruction of adaptively adjusting the resolution of the canvas. For example, the user can activate an instruction "Adjust the resolution" by preset voice, or by long pressing a specified hardware key, or by a control button in the drawing software, or by any one or any combination of an air gesture, shaking/rolling/tilting the terminal, etc. The user can also activate the instruction by a drawing pen, a wearable device or other external controllers.

In the processing of adaptively adjusting the resolution of the canvas, the adjusted resolution of the canvas is determined according to the size of the current canvas, the size of the terminal screen and the resolution of the terminal screen. The specific description is as below.

If it can be ensured that the resolution of the current canvas is the same as the display resolution of the terminal screen, the display quality of the canvas can be ensured, and the terminal apparatus can determine the resolution of the current canvas according to a ratio of the size of the current canvas and the size of the terminal screen.

For example, if the initial resolution of the canvas is $x0 \times y0$, the display resolution of the screen is $x1 \times y1$ and the zoom scale upper limit of the canvas is K1, as shown in FIG.

15; the resolution coefficients of the canvas is constantly 1 when the zoom scale of the canvas is less than K0; and the resolution coefficient s is proportional to the zoom scale k of the canvas when the zoom scale of the canvas is greater than K0 but less than the zoom scale upper limit K1 of the canvas. Wherein, K0 is determined by the ratio of the display resolution of the terminal screen and the resolution of the canvas, that is, $$K0 = \frac{x1}{x0} = \frac{y1}{y0}.$$

When the zoom scale of the canvas is K0, the resolution of the canvas region displayed on the terminal screen is equal to the display resolution of the terminal screen; and, when the zoom scale of the canvas is greater than K0, the resolution coefficients of the canvas is proportional to the zoom scale k, so that the resolution of the display region on the terminal screen is the same as the display resolution of the terminal screen, and the display quality of the canvas is thus ensured.

Figure 16A:
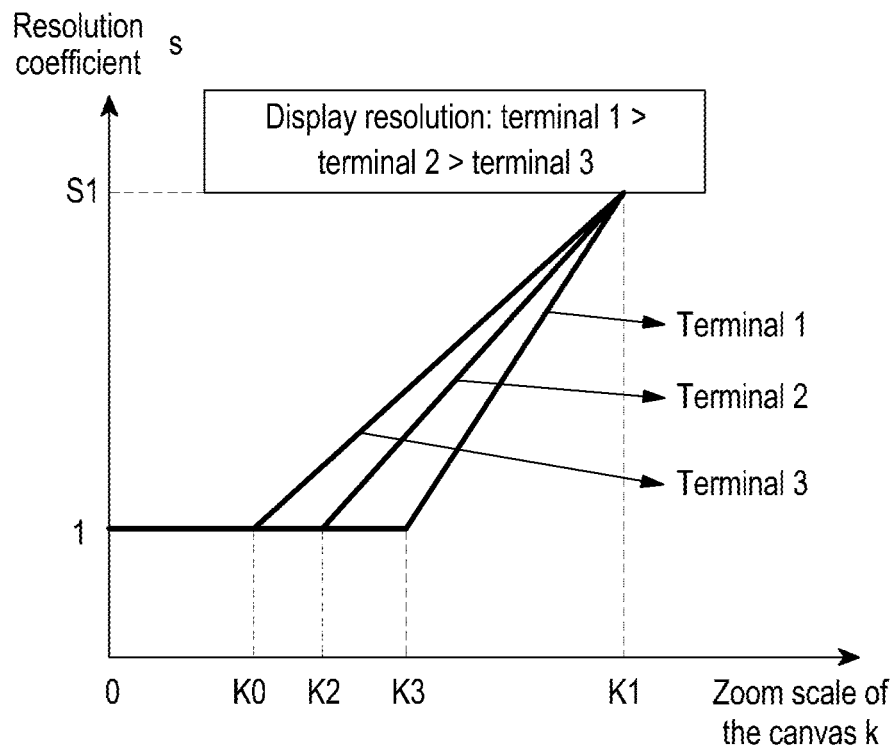
FIG. 16A is a schematic coordinate diagram of a relation between the terminal display resolution and the zoom scale of the canvas according to an embodiment of the present disclosure.
Figure 16B:
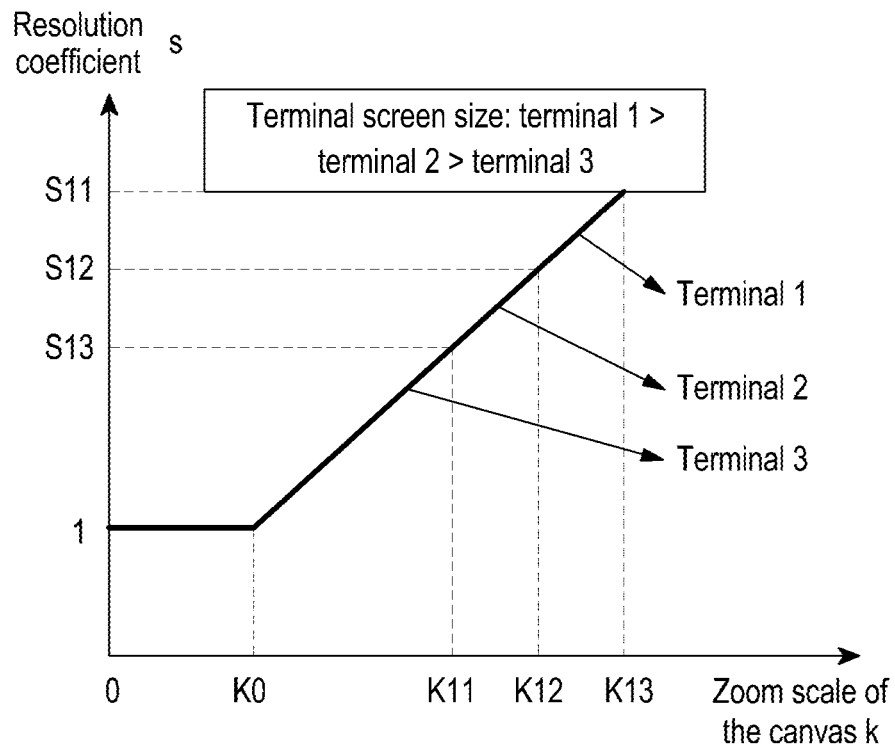
FIG. 16B is a schematic coordinate diagram of a relation between the size of the terminal display screen and the zoom scale of the canvas according to an embodiment of the present disclosure.

Wherein, a zoom scale lower limit K0 for triggering the adaptive increasing of the resolution of the canvas is related to the display resolution of the terminal screen, and the zoom scale upper limit K1 of the canvas is related to the size of the terminal screen, so the determination of the resolution of the canvas is related to the display resolution and size of the terminal screen. As shown in FIG. 16A, if the display resolution of the terminal screen is higher, K0 is larger, that is, the zoom scale lower limit for triggering the adaptive increasing of the resolution of the canvas is larger. When the size of the terminal screen is the same, that is, when K1 is the same, the rate of increasing of the resolution of the canvas is larger. As shown in FIG. 16B, if the size of the terminal screen is larger, the zoom scale upper limit K1 of the canvas is smaller; and if the resolution of the terminal screen is the same, that is, when K0 is the same, the maximum value of the resolution coefficient s is smaller.

Furthermore, the processing of adaptively adjusting the resolution of the canvas further includes performing image processing on the canvas to increase the resolution of the canvas. When the canvas is zoomed-in to a certain scale, the resolution of the canvas is lower than the display resolution of the terminal screen, so the display quality of the canvas will be reduced. Hence, it is required to increase the resolution of the canvas so as to improve the display quality of the canvas. Specifically, the processing can be performed in at least one of the following.

1. Interpolating

After the terminal apparatus triggers the adaptive adjustment of the resolution of the canvas, color values of the added pixel points of the canvas need to be determined. Image interpolation is a most common method in which the color value of an interpolated pixel point can be calculated according to the color values of the points adjacent to it in the canvas. The way of interpolation includes nearest point interpolation, bilinear interpolation and high-order interpolation, among which the bilinear interpolation is most commonly used.

2. Natural border smoothing

Figure 17:
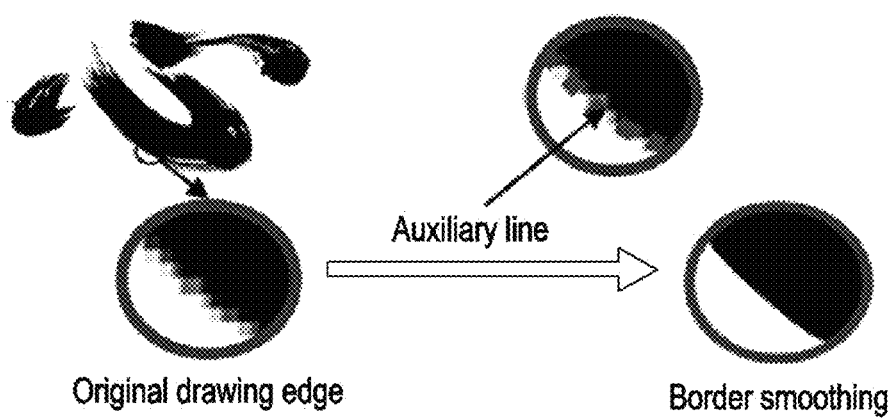
FIG. 17 is a schematic diagram of border smoothing according to an embodiment of the present disclosure.

After the canvas is zoomed-in, zigzags will occur on the border. Anti-aliasing can be performed by natural border smoothing. After triggering the adaptive adjustment of the resolution of the canvas, the terminal apparatus will automatically detect the lines in the canvas and the drawing border of the drawing object, fit the border, provide for auxiliary lines and smoothen the border in the image, in order to improve the drawing quality of the canvas, as shown in FIG. 17.

3. Line interior smoothing

Figure 18:
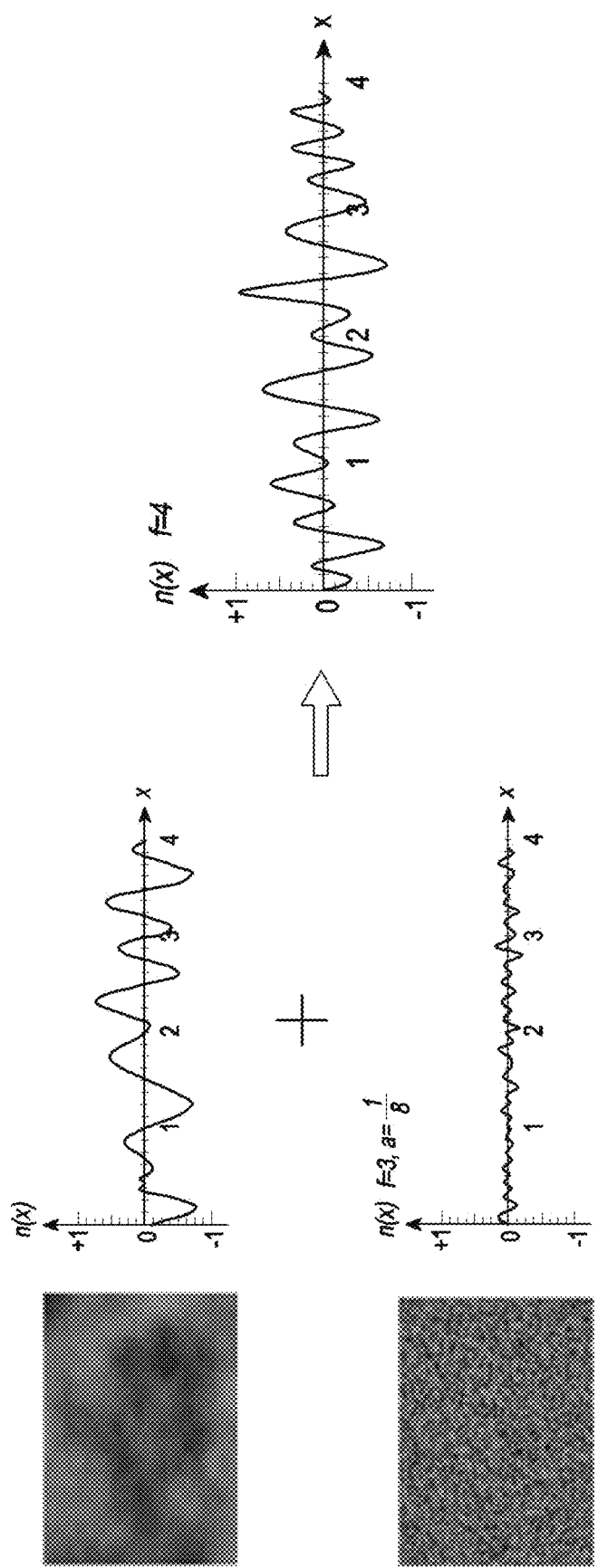
FIG. 18 is a schematic diagram of supplementing interior details according to an embodiment of the present disclosure.

After the terminal apparatus triggers the adaptive adjustment of the resolution of the canvas, the lines or stroke content can be enhanced in texture by Perlin noise, as shown in FIG. 18, so that the texture information within some lines or stroke content on the canvas becomes more realistic.

4. Contour adjustment

Figure 19:
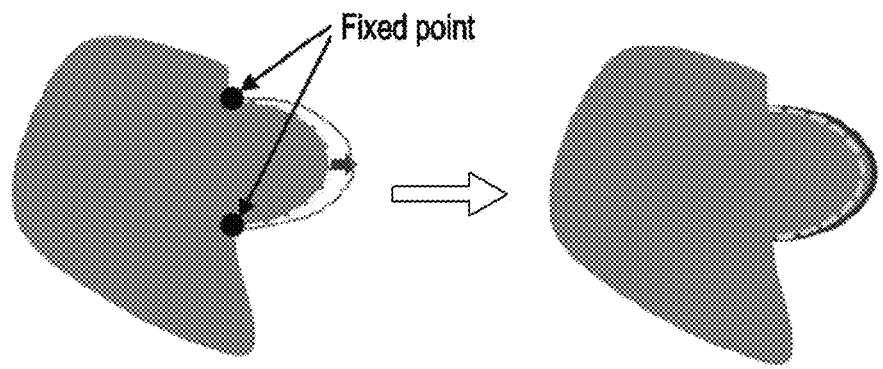
FIG. 19 is a schematic diagram of local fine-adjustment according to an embodiment of the present disclosure.

After the terminal apparatus triggers the adaptive adjustment of the resolution of the canvas, the resolution of the canvas is increased, and the user can perform local fine-adjustment on the drawn content as needed. As shown in FIG. 19, the terminal system can recognize the contour line between two fixed points according to the two points fixed by the user, and perform fine-adjustment on the contour according to the manual processing of the user.

VI. Expanding a canvas bearing the drawing content

When in drawing, the user usually designs the layout and then draws. Sometimes, however, the user may want to add some content. The terminal apparatus can determine the drawing intention of the user according to the detected motion state of the drawing pen, and automatically expand the canvas according to the drawing intention of the user. For example, during or after the drawing, the user wants to add some content. In this case, during the drawing, the system will automatically detect the drawing tendency of the pen. If the tail of a stroke goes beyond the canvas, the system will automatically expand the canvas at the end of this stroke, automatically supplement the tail according to the tendency of the current stroke, and use the supplemented stroke tail as the display region of the terminal screen. The user can continue the drawing.

Specific embodiment 1: After drawing a landscape painting, the user wants to add a poem next to the painting, but there is no space reserved for the poem before planning. In this case, the user can continue his/her creation and the canvas will automatically expand when the stroke goes beyond the canvas.

Specific embodiment 2: The user wants to draw a Riverside Scene at Qingming Festival. However, the preset size ratio and the resolution of the canvas are limited. In this case, the user can draw the Riverside Scene at Qingming Festival by dividing it into several sections from left to right, and every time when one section is completely drawn, the canvas will automatically expand so that the user can continue drawing the next section.

During the practical drawing, the thickness and length of strokes drawn are different according to different drawing pressures and speeds. In drawing software, the shape of strokes can be calculated according to the pressure and speed of the drawing pen. The canvas can be automatically expanded according to the tendency, pressure or other information of the strokes. The user also can deactivate the function of automatically expanding the canvas. In this case, the system automatically adds a virtual canvas for the canvas, in order to automatically supplement the tail of the previously drawn content when expanding the canvas subsequently. The automatic expansion of the canvas can be specifically triggered in at least one of the following ways.

1. Motion tendency of the drawing pen

The motion tendency of the drawing pen can be decided on the basis of the motion direction, speed, pressure and other information of the drawing pen. The terminal apparatus determines a change in the motion trajectory according to the motion direction of the drawing pen, and determines the shape of the motion trajectory and the tail of the strokes according to the motion speed and pressure of the drawing pen. When the terminal apparatus detects that the drawing pen has reached the screen edge, and when the motion direction is directed to the outside of the screen and both the speed and the pressure of the drawing pen are greater than 0, the terminal considers that this stroke of the user is not completely drawn and thus triggers the function of expanding the canvas.

2. Canvas region displayed on the terminal screen

When the user draws on the terminal apparatus, due to limited size of the terminal screen, the user usually changes the size of the canvas and the display region of the canvas on the screen by zooming/moving. If the display region on the terminal screen contains the border of the canvas or if the border of the canvas is coincided with the border of the terminal screen, the function of expanding the canvas is triggered when the terminal detects that the drawing position of the drawing pen reaches the border of the canvas but the drawing speed and pressure of the drawing pen are not reduced to zero at the border of the canvas.

If that displayed on the terminal screen is only part of the canvas and does not contain the border of the canvas, when the terminal detects that the position of the drawing pen reaches the border of the screen but the speed and pressure of the drawing pen are not reduced to zero, the tail of strokes is automatically calculated, and if the calculated tail of strokes goes beyond the border of the current canvas, the function of expanding the canvas is triggered.

3. User instruction

The user can send an instruction of expanding the canvas by voice, a key, a gesture, an external controller and other interaction ways, as well as any combination thereof, and the terminal apparatus triggers the function of expanding the canvas after detecting the instruction of expanding the canvas. For example, the user can preset a voice activation instruction "Expand the canvas leftward/rightward/upward/downward". The user can activate the instruction by long pressing a specified hardware key or a control button in the drawing software, or by one or a combination of an air gesture, shaking/rolling/tilting the terminal or more. The user can also activate the instruction by a drawing pen, a wearable device or other external controllers.

This embodiment of the present disclosure proposes that, after expanding the canvas bearing the drawing content, the terminal apparatus also can fit the drawing content of the user in the expanded canvas according to the drawing trajectory of the drawing pen in the canvas and the motion tendency of the drawing pen.

Figure 20:
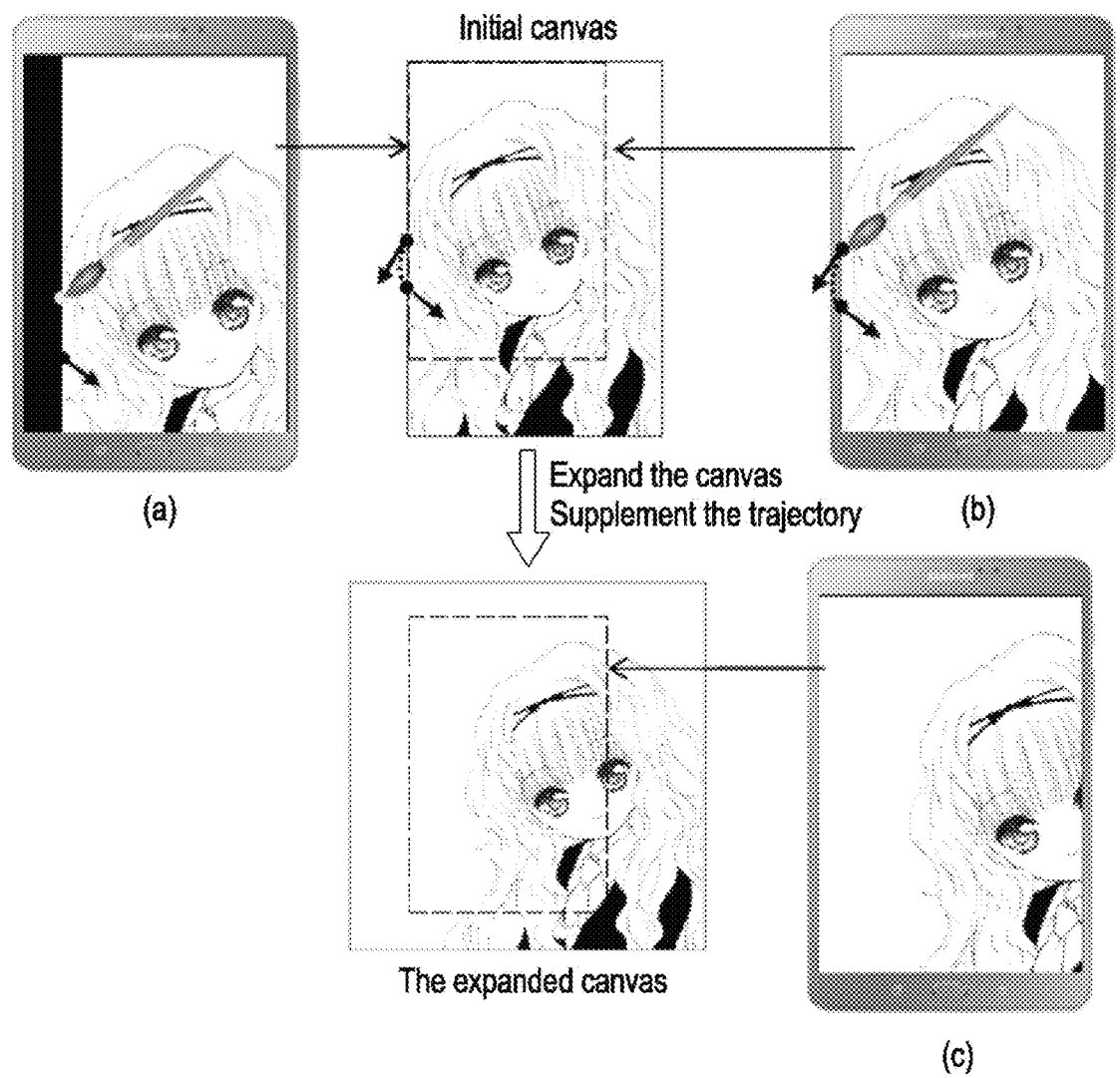
FIG. 20 is a schematic diagram of a process of expanding a canvas according to an embodiment of the present disclosure.

Specifically, the terminal apparatus performs spline fitting on the possible trajectories outside the current canvas according to specific information (for example, the drawing trajectory of the drawing pen in the canvas and the motion tendency of the drawing pen), and determines the width of the expanded canvas. When the terminal apparatus triggers the function of expanding the canvas, if the current screen contains the border of the canvas or the border of the canvas is coincided with the border of the terminal screen, as shown in FIG. 20, the terminal apparatus generates a drawing stroke according to the trajectory of the drawing pen outside the canvas on the screen, as shown in FIG. 20 (a); or, the terminal apparatus records information of the drawing pen, such as the position x0, speed v0 and pressure P0 at which the drawing pen leaves the border, and when it is detected that the drawing pen enters from the border again, the terminal records information of the drawing pen at this moment, such as the position x1, speed v1 and pressure P1. The terminal can obtain the possible trajectory of the drawing pen after leaving the canvas by Bezier spline fitting, and calculate the shape, color and other information of the generated stroke according to the speed and pressure, as shown in FIG. 20 (b). The expanded width of the canvas should be proportional to the calculated width of the generated stroke, as shown in FIG. 20 (c).

If the terminal apparatus detects that the drawing pen does not enter from the border of the canvas after leaving the screen, the possible trajectory and the shape, color and other information are generated by spline fitting according to the trajectory of the drawing pen before leaving the canvas and the speed and pressure of the drawing pen when reaching the border of the canvas.

Figure 21:
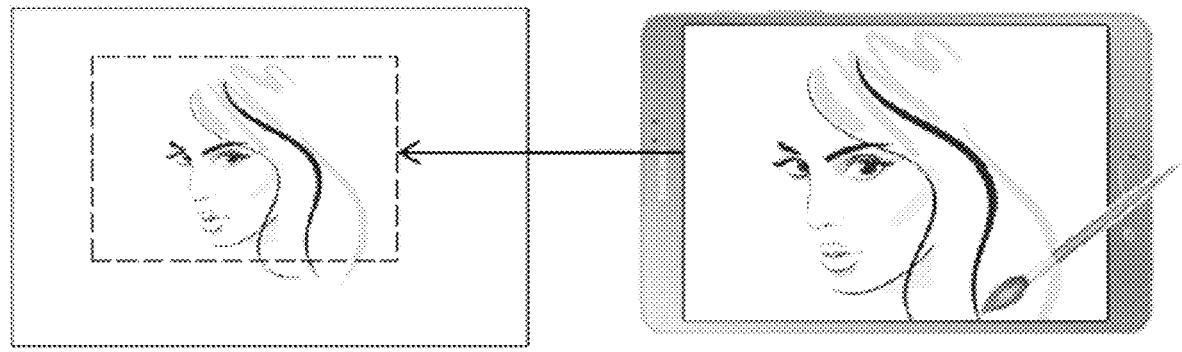
FIG. 21 is a schematic effect diagram of supplementing the tail of strokes according to an embodiment of the present disclosure.

As shown in FIG. 21, if the display region on the screen is part of the canvas, when the terminal apparatus detects that the drawing pen reaches the border of the screen, and if the speed and/or pressure of the drawing pen are not reduced to zero, the terminal automatically calculates the trajectory outside the terminal screen, moves the canvas, and displays the supplemented tail of strokes.

Figure 22A:
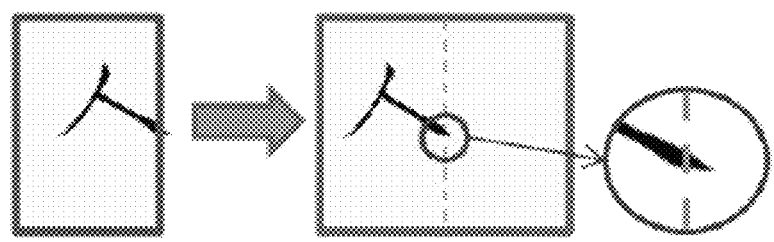
FIG. 22A is a schematic effect diagram of expanding a canvas according to an embodiment of the present disclosure.
Figure 22B:
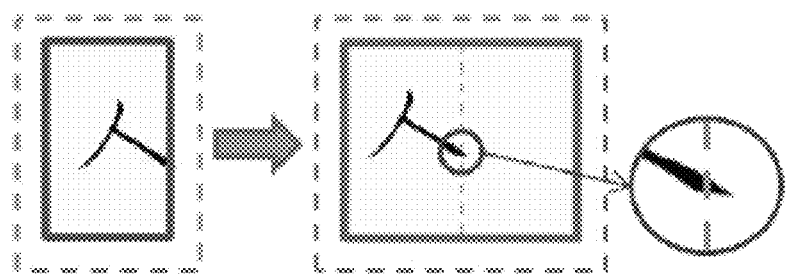
FIG. 22B is a schematic effect diagram of a virtual canvas according to an embodiment of the present disclosure.

The function of automatically expanding the canvas makes the lines drawn by the user more complete and natural, as shown in FIG. 22A. In addition, the user can interrupt or close the function of automatically expanding the canvas at any time if needed. The closing of this function can be realized by a button, a gesture, voice or in other ways. After the user closes the function of automatically expanding the canvas, the stroke drawn up to the edge of the canvas is cut off. In this case, when the user wants to expand the canvas in the future, the stroke effect at the edge looks like less natural. Therefore, when the function of automatically expanding the canvas is closed, the terminal will automatically add a large virtual canvas for the canvas, and on the virtual canvas, there is a complete stroke. When the user wishes to expand the canvas in the future operations, the previously drawn complete stroke can be restored, as shown in FIG. 22B.

Thus, the adaptive adjustment of the resolution of the canvas can be realized according to the zoom scale of the canvas, when the drawing focus is automatically positioned; the canvas can be automatically expanded when the drawing content goes beyond the canvas, and a beatification and fine-adjustment function is additionally provided to the detail information.

VII. Displaying drawing reference information

In some drawing systems, the user is allowed to load pictures as drawing references. However, in conventional systems, reference pictures are usually manually searched and imported. It takes a lot of time for the user to find the pictures or even find no picture, leading to low efficiency and unsatisfactory effect. In the embodiment of the present disclosure, the drawing reference information is found according to the drawing content corresponding to the drawing focus, and the found drawing reference information is displayed. Objects, which are similar to the drawn content, in the local machine or in the network can be searched and then recommended. Wherein, the terminal apparatus can find the drawing reference information according to the content similarity and/or style similarity of the drawing content corresponding to the drawing focus.

For example, in a case where the user sketches a multiple of objects, but the user has no idea about the drawing effect or style that he/she wants to realize during the drawing, the system will automatically recommend some similar content according to the drawn content, so that the user can select the reference pictures according to own preferences.

Figure 23:
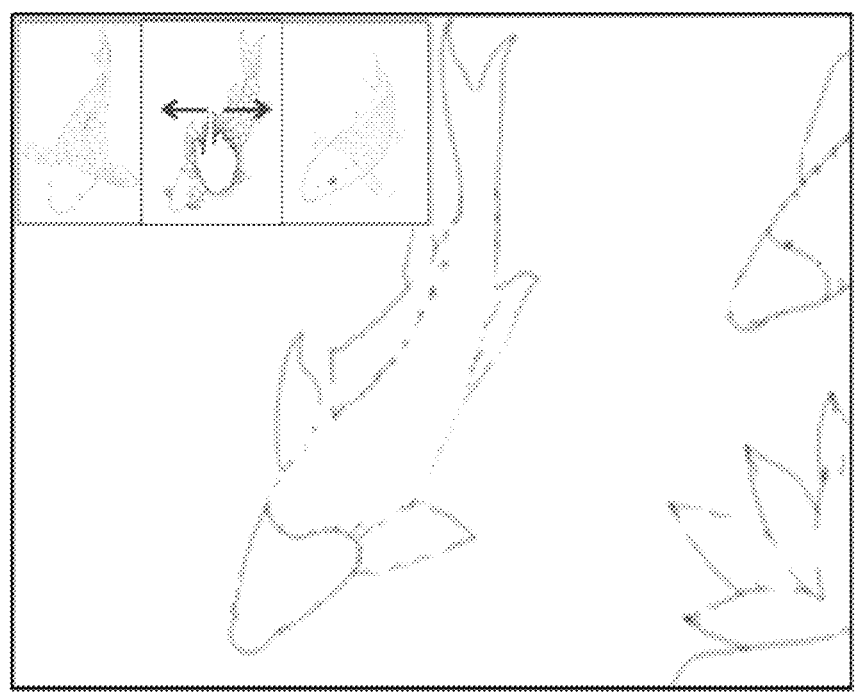
FIG. 23 is a schematic effect diagram of recommending a reference picture according to an embodiment of the present disclosure.

Specific embodiment: The user wants to draw a lotus pond having a school of fish. The user can only imagine several postures although he/she wants to show the different varieties of the fish, and the user has no idea about the style that he/she wants to realize. In this case, the user can sketch the contour of the fish in various postures, and when the user comes into drawing the detail of the fish one by one, the system will automatically perform searching and matching for the currently drawn fish to find similar targets stored in the local machine or in the network for the selection by the user. Then, the user can select the favorite details for drawing, as shown in FIG. 23.

When detecting that the user starts to supplement the details of objects one by one, the terminal triggers the automatic recommendation function. The terminal can trigger the automatic recommendation function while triggering the function of intelligently zooming-in the canvas.

The terminal apparatus can find the drawing reference information according to the content similarity of the drawing content corresponding to the drawing focus. When the terminal triggers the automatic recommendation function, the terminal apparatus preferably searches whether there is any object having similar content in the local machine by an image recognition technology and according to the currently drawn content (i.e., the drawing content corresponding to the drawing focus). If there is a similar picture previously drawn, the corresponding object is captured as a recommend. If the network is available, a similar object is searched over the network as a recommend.

Further, the method of this embodiment further comprises: adjusting a display mode of the drawing reference information based on a display mode of the drawing content corresponding to the drawing focus. The display mode comprises zoom scale and/or display position.

The terminal apparatus adjusts the display region of the recommended information, according to the display region of the canvas when the current canvas is operated by the user. For example, it is assumed that the zoom scale of the current canvas is k1, the position of the canvas corresponding to the center of the terminal screen is (x1,y1), the initial zoom scale of the recommended image is k2, and the position of the recommended image corresponding to the center of a recommended information window is (x2,y2), when the terminal detects that the zoom scale of the current canvas becomes k1' and the position of the canvas corresponding to the center of the terminal screen is (x1',y1'), the terminal automatically adjusts the zoom scale and display position of the recommended content, the zoom scale of the recommended image becomes $$k'_2 = \frac{k'_1}{k_1} k_2,$$

and the position of the recommended image corresponding to the center of a recommended information window is (x2',y2'), where $$x'_2 = \frac{k_2}{k_1}(x'_1 - x_1) \text{ and } y'_2 = \frac{k_2}{k_1}(y'_1 - y_1).$$

Figure 24:
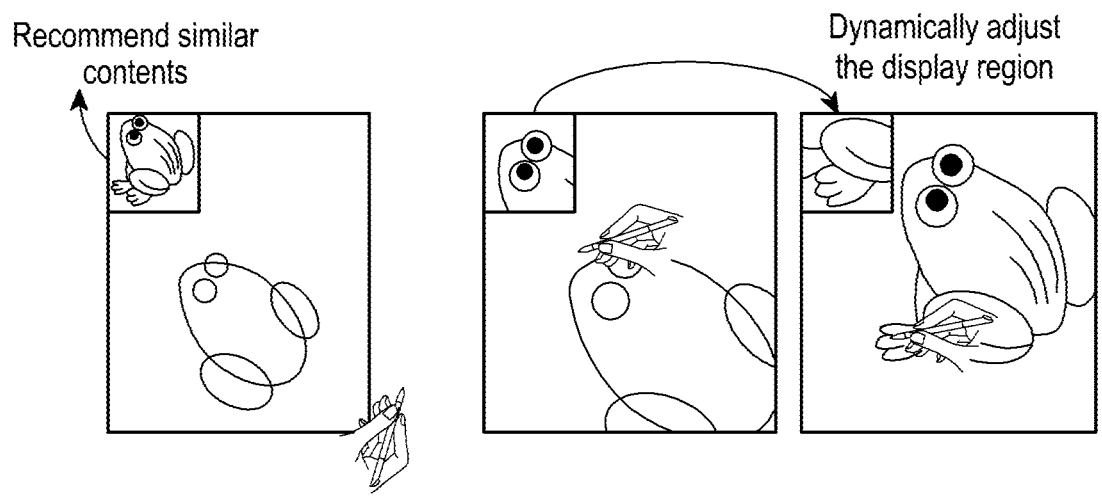
FIG. 24 is a schematic effect diagram of dynamically adjusting a display mode of the reference picture according to an embodiment of the present disclosure.

As shown in FIG. 24, after the user selects a reference picture, the picture dynamically changes with the operation of the user. The corresponding region is displayed in the recommended window. If the user is drawing the eyes, the detail information of the eyes is automatically shown in a small window. When the user drags the canvas, the display portion changes correspondingly; and when the user zooms the canvas, the display portion zooms correspondingly. If the user is drawing the head, the head is automatically moved to the display window. When the user drags the canvas to the feet, the feet are displayed by the terminal apparatus in a small window. The drawing focus is always used as the display focus.

By such processing, automatically searching and dynamically display an image similar to the drawing content as reference information can be realized during the drawing.

Figure 25:
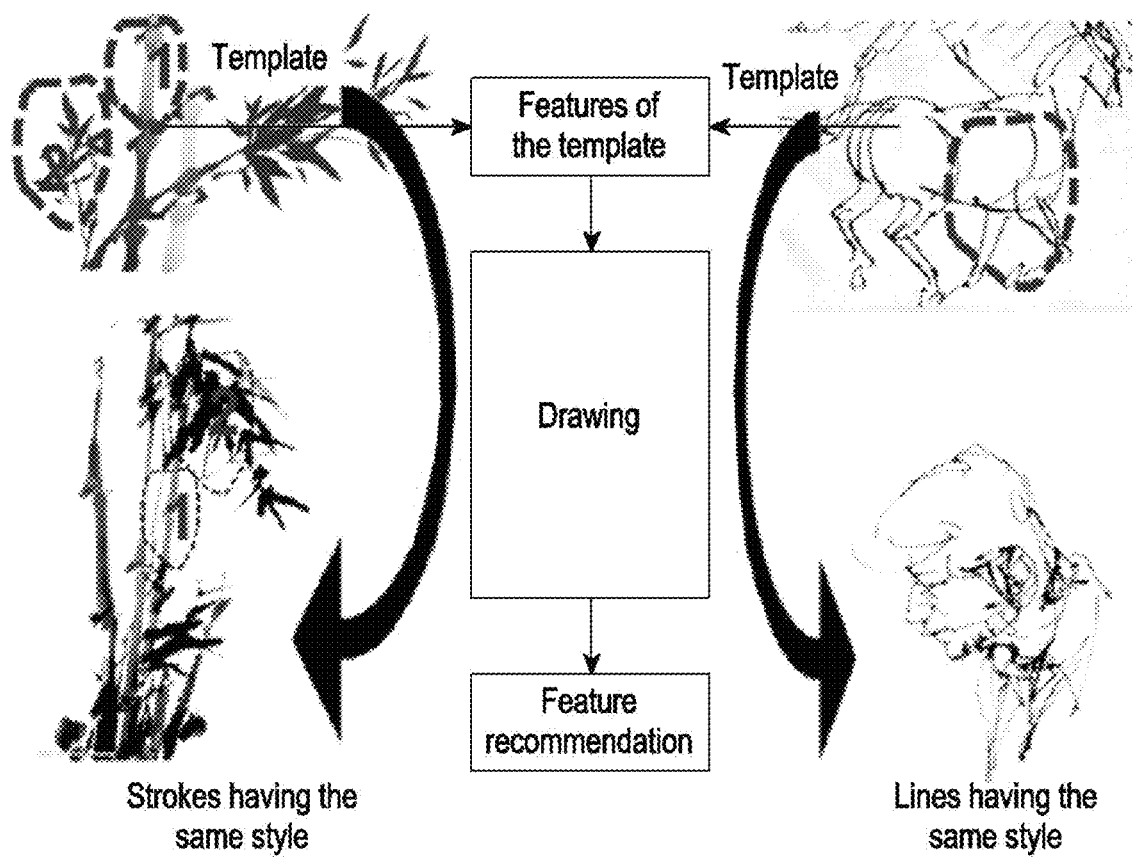
FIG. 25 is a schematic diagram of drawing in a recommended style according to an embodiment of the present disclosure.

The terminal apparatus can find the drawing reference information according to the style similarity of the drawing content corresponding to the drawing focus. Specifically, an image having a certain drawing style, which is similar to the currently drawn content, can be searched as a recommend by image processing technologies such as edge feature extraction. The user can select a favorite drawing style among the recommended images, and can also manually select a favorite drawing style from other pictures. According to the selected pictures and the selected region by the user, the terminal apparatus analyzes the related information, extracts a drawing style and builds a knowledge base, so that the drawing effect of the same style can be realized during drawing, as shown in FIG. 25.

A recommended style template is selected mainly by circling or clicking. Information extracted from the picture can be hue, texture, illumination, lines, morphology or more. Then, the drawing effect of the same style is generated in real time according to the pressure, thickness or more of the pen during the drawing. Also, style copying can be carried out at the end of drawing.

Figure 26:
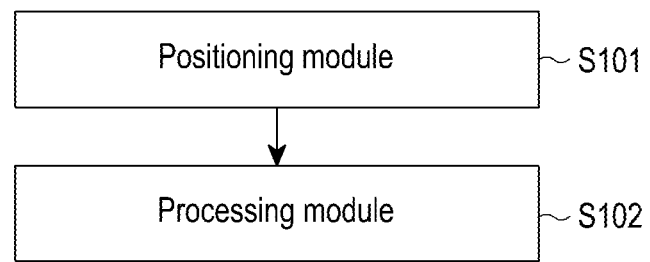
FIG. 26 is a structural diagram of a drawing content processing device for a terminal apparatus according to the present disclosure.

FIG. 26 is a structural diagram of a drawing content processing device for a terminal apparatus according to another embodiment of the present disclosure, comprising a positioning module 11 and a processing module 12, wherein:

the positioning module 11 is configured to position a drawing focus of a user based on a drawing operation of the user; and the processing module 12 is configured to correspondingly process a drawing content displayed by the terminal apparatus according to the positioned drawing focus.

Figure 27:
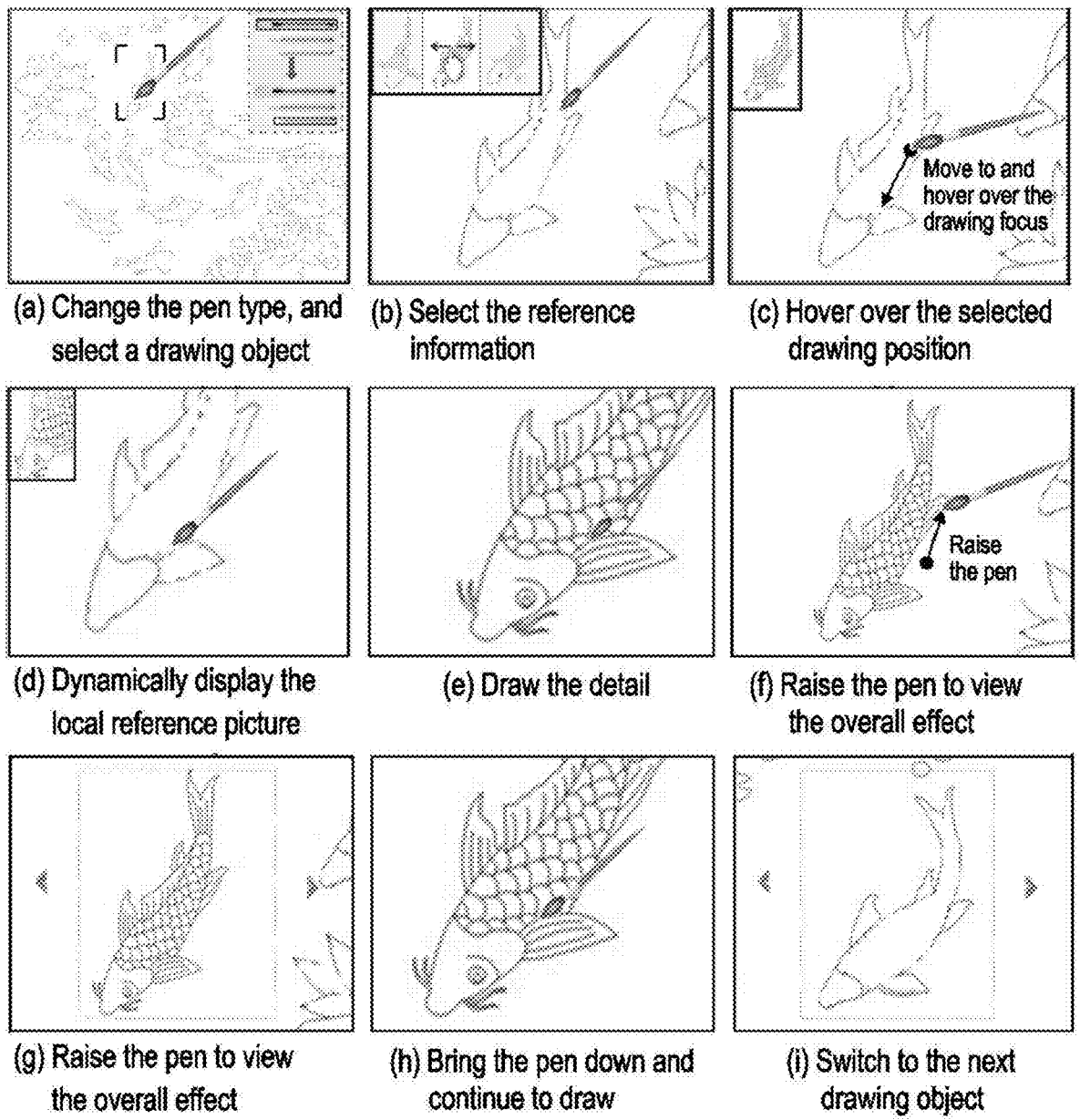
FIG. 27 is a schematic diagram of specific processing of the terminal apparatus during the drawing according to the present disclosure.

The present disclosure further provides a terminal apparatus configured to execute the drawing content processing method for the terminal apparatus, or built-in with a drawing content processing device for the terminal apparatus. FIG. 27 is a schematic diagram of specific processing of the terminal apparatus during the drawing.

In FIG. 27 (a) to FIG. 27 (e), the user changes the pen type, so that the terminal apparatus is triggered to activate the function of expanding the canvas, the drawing pen moves toward the target drawing object, it is difficult for the user to immediately select the position to be drawn if the proportion of the object selected by the user in the canvas is very small, and the terminal will display the automatically recognized object on the terminal screen, referring to FIG. 27 (a); in this case, the user can select the position to be drawn very conveniently, referring to FIG. 27 (b); the user puts the pen toward the position to be drawn and hovers the pen over the position, referring to FIG. 27 (c); at the same time, the terminal apparatus will intelligently zoom-in the canvas by taking the hovering position as the center, referring to FIG. 27 (d); and the user can now start to draw, referring to FIG. 27 (e). If the canvas is zoomed-in to a state as shown in FIG. 27 (b), or the user considers that the zooming-in factor has met the user's demands during the intelligent zooming-in of the canvas by the system as shown in FIG. 27 (e), the user can interrupt the intelligent zooming-in processing of the terminal apparatus at any time. Then, the drawing state as shown in FIG. 27 (e) can be obtained.

FIG. 27 (f) shows a case in which the user raises the pen to view the overall drawing effect after drawing the details. The system automatically selects a region having the highest correlation with the currently drawn content for displaying, and displays regions in different levels related to the drawing content according to the height of raising the pen, so that the user can effectively and gradually view the overall drawing effect. When the height of raising the pen reaches a predetermined height threshold, the whole canvas is displayed.

FIG. 27 (g) shows a case in which the user views the overall effect of the drawing content in a related local region. The user may continuously modify or draw in this region after viewing the overall effect, or may want to draw the next object because of being satisfied with the drawing effect. When the position of bringing a pen down, selected by the user, is within the region before raising the pen, the system considers that the user wants to continuously draw or modify. If the distance from the selected position to the drawing position before raising the pen is less than a preset threshold, the system considers that the user wants to continuously draw, and then the system automatically restores the zoomed-in state of the canvas to the state before raising the pen and positions the drawing position before raising the pen to the current mapping position of the pen on the screen of the terminal apparatus, as shown in FIG. 27 (h). If the distance from the selected position to the drawing position before raising the pen is greater than the preset threshold, the system considers that the user wants to modify the drawn content at the selected position, and then the system automatically restores the zoomed-in state of the canvas to the zoomed-in state of the canvas in which the pen is drawing at the current mapping position on the screen of the terminal apparatus. If the user is satisfied with the current drawing effect, the user may want to continuously draw the next object. There are many similar drawing objects in the canvas, the user usually tends to finish the drawing of the similar objects one by one and then draw other objects. When there is a large distance between those similar objects, the terminal apparatus can provide an automatic switchover function to the user. In this way, the user can select a drawing object recommended by the system by a switchover key displayed on the terminal apparatus, after completely drawing one object, as shown in FIG. 27 (i).

Compared with conventional systems, the present disclosure has the following advantages.

1. When it is required to position a drawing focus during the drawing, what the user needs to do is merely raise the pen/put the pen down/change the pen or more, and the method or device of the present disclosure will position the drawing focus in real time by automatically combing the interactive operations of the pen and the drawing objects. In this way, the operations of continuously and manually zooming and dragging when positioning the drawing focus are simplified. Meanwhile, during the positioning of the focus, the display quality of the drawn picture and the drawing rate are improved by the adaptive adjustment of the resolution; the reference content is recommended in real time; and the user is allowed to specify a drawing style, so that it is more convenient to obtain the same drawing style.

2. Even if drawing on a terminal of a limited size, the drawing experience better than drawing on a real canvas can be obtained.

3. The user does not need to manually zoom and drag the canvas to position the drawing focus, conforming to the operation habits of the user and leading to high drawing efficiency.

4. When the drawing by the user is interrupted, the previous drawing position can be positioned automatically, so that it will not take a long period of time for the user to find the drawing position.

5. When the drawing objects are far apart from each other, automatic switchover between the drawing objects is realized, so that the user is free of tedious operations such as manually zooming, dragging and zooming again.

6. During the drawing by the user, recommended information is provided dynamically in real time according to the drawn content, thereby providing references to the user for drawing.

7. Instead of setting complex parameters of the drawing pen to realize some special effects, the user can specify his/her favorite drawing style from images very conveniently. And, the drawing effect will be enriched.

The foregoing descriptions are merely some implementations of the present disclosure. It should be noted that, to a person of ordinary skill in the art, various improvements and modifications may be made without departing from the principle of the present disclosure, and these improvements and modifications shall be regarded as falling into the protection scope of the present disclosure.

What is claimed is:

1. A method by a terminal apparatus, comprising:
   identifying a drawing focus based on a drawing operation;
   positioning the drawing focus on a canvas; and
   processing drawing content to be displayed on a screen based on the drawing focus,
   wherein the drawing focus is a logical region or position which is drawn in the canvas,
   wherein the drawing focus is identified based on another drawing focus preceding the drawing focus, and
   wherein another drawing focus preceding the drawing focus is at least one of:
      a drawing focus drawing the content in the last time, or
      a drawing focus before an operation of raising an input device when an operation of lowering the input device occurs after the operation of raising the input device.

2. The method of claim 1, wherein the drawing operation comprises at least one of an operation of selecting the drawing focus, the operation of lowering the input device, and an operation of hovering the input device, and
   wherein the processing of the drawing content comprises at least one of zooming-in, zooming-out, moving a display position of the drawing focus, and displaying drawing reference information.

3. The method of claim 2, wherein the zooming-in is triggered based on at least one of an operation of modifying parameters of the input device,
   wherein the parameters of the input device include at least one of an input device type, a line type, line color and texture information, information about the drawing content corresponding to the drawing focus, a distance from the input device to the terminal apparatus, a speed of bringing the input device down, a size of the screen, and an instruction for the zooming-in, and
   wherein the zooming-out is triggered based on at least one of an operation of raising the input device, an instruction for the zooming-out, processing information of the drawing content corresponding to the drawing focus, the distance from the input device to the terminal apparatus, a speed of raising the input device, and the size of the screen.

4. The method of claim 2, wherein the processing of the drawing content further comprises switching between drawing objects, and
wherein the switching between the drawing objects is triggered based on at least one of an operation of raising the input device, an instruction, similarity between the drawing objects, a display position of each of the drawing objects, and processing information of the drawing content corresponding to the drawing focus.

5. The method of claim 4, wherein each of the drawing objects is identified based on at least one of:
a distance between the drawing objects corresponding to the drawing focus, similarity between the drawing objects corresponding to the drawing focus and an instruction.

6. The method of claim 2, wherein the processing of the drawing content further comprises adjusting a resolution of the drawing content, and
wherein the adjusting the resolution of the drawing content is triggered based on at least one of a change in a zoom scale of the canvas and an instruction.

7. The method of claim 2, wherein the processing of the drawing content further comprises expanding the canvas including the drawing content, and
after expanding the canvas, fitting the drawing content in the expanded canvas according to a drawing trajectory of the input device in the canvas and a motion trend of the input device.

8. The method of claim 1, wherein the drawing focus is further identified based on information about the drawing content within a local region of a mapping position of the input device on the screen comprising at least one of:
thickness information for lines in the drawing content, density information for the lines in the drawing content, shape information for the lines in the drawing content, color information for the lines in the drawing content, texture information for the drawing content, and border information for the drawing content.

9. The method of claim 8, wherein the moving the display position of the drawing focus comprises:
moving the drawing focus to a preset position on the screen for displaying; and/or
moving the display position of the drawing focus to correspond to the mapping position of the input device on the screen.

10. A terminal apparatus, comprising:
a display; and
at least one processor configured to:
identify a drawing focus based on a drawing operation;
position the drawing focus on a canvas; and
process drawing content to be displayed on a screen based on the drawing focus,
wherein the drawing focus is a logical region or position which is drawn in the canvas,
wherein the drawing focus is identified based on another drawing focus preceding the drawing focus, and
wherein another drawing focus preceding the drawing focus is at least one of:
a drawing focus drawing the content in the last time, or
a drawing focus before an operation of raising an input device when an operation of lowering the input device occurs after the operation of raising the input device.

11. The terminal apparatus of claim 10, wherein the drawing operation comprises at least one of an operation of selecting the drawing focus, the operation of lowering the input device, and an operation of hovering the input device, and
wherein the processing of the drawing content comprises at least one of zooming-in, zooming-out, moving a display position of the drawing focus, and displaying drawing reference information.

12. The terminal apparatus of claim 11, wherein the zooming-in is triggered based on at least one of an operation of modifying parameters of the input device,
wherein the parameters of the input device include at least one of an input device type, a line type, line color and texture information, information about the drawing content corresponding to the drawing focus, a distance from the input device to the terminal apparatus, a speed of bringing the input device down, a size of the screen, and an instruction for the zooming-in, and
wherein the zooming-out is triggered based on at least one of an operation of raising the input device, an instruction for the zooming-out, processing information of the drawing content corresponding to the drawing focus, the distance from the input device to the terminal apparatus, a speed of raising the input device, and the size of the screen.

13. The terminal apparatus of claim 11, wherein the processing of the drawing content further comprises switching between drawing objects, and
wherein the switching between the drawing objects is triggered based on at least one of an operation of raising the input device, an instruction, similarity between the drawing objects, a display position of each of the drawing objects, and processing information of the drawing content corresponding to the drawing focus.

14. The terminal apparatus of claim 13, wherein each of the drawing objects is identified based on at least one of:
a distance between the drawing objects corresponding to the drawing focus, similarity between the drawing objects corresponding to the drawing focus, and an instruction.

15. The terminal apparatus of claim 11, wherein the processing of the drawing content further comprises adjusting a resolution of the drawing content, and
wherein the adjusting the resolution of the drawing content is triggered based on at least one of a change in zoom scale of the canvas and an instruction.

16. The terminal apparatus of claim 11, wherein the processing of the drawing content further comprises expanding the canvas including the drawing content, and
wherein the at least one processor is further configured to:
after expanding the canvas, fit the drawing content in the expanded canvas according to a drawing trajectory of the input device in the canvas and a motion trend of the input device.

17. The terminal apparatus of claim 10, wherein the drawing focus is further identified based on information about the drawing content within a local region of a mapping position of the input device on the screen comprising at least one of:
thickness information for lines in the drawing content, density information for the lines in the drawing content, shape information for the lines of the drawing content, color information for the lines in the drawing content, texture information for the drawing content, and border information for the drawing content.

18. The terminal apparatus of claim 17, wherein the moving the display position of the drawing focus comprises:
moving the drawing focus to a preset position on the screen for displaying; and/or
moving the display position of the drawing focus to correspond to the mapping position of the input device on the screen.

* * * * *